(12) United States Patent
Bobak et al.

(10) Patent No.: US 11,985,147 B2
(45) Date of Patent: May 14, 2024

(54) SYSTEM AND METHOD FOR DETECTING A CYBERATTACK

(71) Applicant: TRUST LTD., Moscow (RU)

(72) Inventors: Timothy John Oscar Bobak, London (GB); Dmitry Volkov, Moscow (RU)

(73) Assignee: TRUST LTD., Moscow (RU)

( * ) Notice: Subject to any disclaimer, the term of this patent is extended or adjusted under 35 U.S.C. 154(b) by 285 days.

(21) Appl. No.: 17/712,243

(22) Filed: Apr. 4, 2022

(65) Prior Publication Data

US 2022/0385678 A1    Dec. 1, 2022

(30) Foreign Application Priority Data

Jun. 1, 2021  (RU) .......................... RU2021115690

(51) Int. Cl.
  *H04L 9/40*   (2022.01)
  *H04L 41/14*   (2022.01)

(52) U.S. Cl.
  CPC ........ *H04L 63/1416* (2013.01); *H04L 41/145* (2013.01); *H04L 63/1433* (2013.01)

(58) Field of Classification Search
  CPC ............. H04L 63/1416; H04L 63/1433; H04L 41/145; H04L 41/22; G06F 21/554
  See application file for complete search history.

(56) References Cited

U.S. PATENT DOCUMENTS

| 7,225,343 | B1 | 5/2007 | Honig et al. |
| 7,496,628 | B2 | 2/2009 | Arnold et al. |

(Continued)

FOREIGN PATENT DOCUMENTS

| CN | 103491205 A | 1/2014 |
| CN | 104504307 A | 4/2015 |

(Continued)

OTHER PUBLICATIONS

English Translation of CN106713312, © Questel—FAMPAT, Jul. 17, 2019.

(Continued)

*Primary Examiner* — Sarah Su
(74) *Attorney, Agent, or Firm* — BCF LLP

(57) ABSTRACT

A method and a system for identifying indicators of compromise in a network infrastructure are provided. The method being executable by a computing device communicatively couplable to the network infrastructure, the computing devices being positioned outside a perimeter of the network infrastructure. The method comprises: obtaining an infrastructure graph for the network infrastructure, identifying, for a given protected infrastructure element, a portion of the infrastructure graph including vertices representative of linked infrastructure elements; analyzing a given one of the linked infrastructure elements to determine a respective value thereof; determining whether the respective value of the given one of the linked infrastructure elements is indicative of the network infrastructure being compromised; in response to the respective value of any one of the linked infrastructure elements associated to the given protected infrastructure element being indicative of the network infrastructure being compromised: generating and transmitting at least one warning about a potential cyberattack.

12 Claims, 7 Drawing Sheets

(56) References Cited

U.S. PATENT DOCUMENTS

| | | |
|---|---|---|
| 7,512,980 B2 | 3/2009 | Copeland et al. |
| 7,712,136 B2 | 5/2010 | Sprosts et al. |
| 7,730,040 B2 | 6/2010 | Reasor et al. |
| 7,865,953 B1 | 1/2011 | Hsieh et al. |
| 7,926,113 B1 | 4/2011 | Gula et al. |
| 7,930,256 B2 | 4/2011 | Gonsalves et al. |
| 7,958,555 B1 | 6/2011 | Chen et al. |
| 7,984,500 B1 | 7/2011 | Khanna et al. |
| 8,132,250 B2 | 3/2012 | Judge et al. |
| 8,151,341 B1 | 4/2012 | Gudov |
| 8,176,178 B2 | 5/2012 | Thomas et al. |
| 8,255,532 B2 | 8/2012 | Smith-Mickelson et al. |
| 8,260,914 B1* | 9/2012 | Ranjan |
| 8,285,830 B1 | 10/2012 | Stout et al. |
| 8,402,543 B1 | 3/2013 | Ranjan et al. |
| 8,448,245 B2 | 5/2013 | Banerjee et al. |
| 8,532,382 B1 | 9/2013 | Ioffe |
| 8,533,819 B2 | 9/2013 | Hoeflin et al. |
| 8,539,582 B1 | 9/2013 | Aziz et al. |
| 8,555,388 B1 | 10/2013 | Wang et al. |
| 8,561,177 B1 | 10/2013 | Aziz et al. |
| 8,578,491 B2 | 11/2013 | Mcnamee et al. |
| 8,600,993 B1 | 12/2013 | Gupta et al. |
| 8,612,463 B2 | 12/2013 | Brdiczka et al. |
| 8,625,033 B1 | 1/2014 | Marwood et al. |
| 8,635,696 B1 | 1/2014 | Aziz |
| 8,635,700 B2 | 1/2014 | Richard et al. |
| 8,650,080 B2 | 2/2014 | O'Connell et al. |
| 8,660,296 B1 | 2/2014 | Ioffe |
| 8,677,472 B1 | 3/2014 | Dotan et al. |
| 8,776,229 B1 | 7/2014 | Aziz |
| 8,839,441 B2 | 9/2014 | Saxena et al. |
| 8,850,571 B2 | 9/2014 | Staniford et al. |
| 8,856,937 B1 | 10/2014 | Wüest et al. |
| 8,972,412 B1 | 3/2015 | Christian et al. |
| 8,984,640 B1 | 3/2015 | Emigh et al. |
| 9,026,840 B1 | 5/2015 | Kim |
| 9,043,920 B2 | 5/2015 | Gula et al. |
| 9,060,018 B1 | 6/2015 | Yu et al. |
| 9,130,980 B2 | 9/2015 | Law et al. |
| 9,210,111 B2 | 12/2015 | Chasin et al. |
| 9,215,239 B1 | 12/2015 | Wang et al. |
| 9,253,208 B1 | 2/2016 | Koshelev |
| 9,292,691 B1 | 3/2016 | Hittel |
| 9,330,258 B1 | 5/2016 | Satish et al. |
| 9,338,181 B1 | 5/2016 | Burns et al. |
| 9,357,469 B2 | 5/2016 | Smith et al. |
| 9,456,000 B1 | 9/2016 | Spiro et al. |
| 9,654,593 B2 | 5/2017 | Garg et al. |
| 9,723,344 B1 | 8/2017 | Granström et al. |
| 9,736,178 B1 | 8/2017 | Ashley |
| 9,838,407 B1 | 12/2017 | Oprea et al. |
| 9,917,852 B1 | 3/2018 | Xu et al. |
| 9,934,376 B1 | 4/2018 | Ismael |
| 10,110,601 B1 | 10/2018 | Jakobsson et al. |
| 10,212,175 B2 | 2/2019 | Seul et al. |
| 10,284,595 B2 | 5/2019 | Reddy et al. |
| 10,326,777 B2 | 6/2019 | Demopoulos et al. |
| 10,440,050 B1 | 10/2019 | Neel et al. |
| 10,462,169 B2 | 10/2019 | Joseph et al. |
| 10,630,674 B2 | 4/2020 | Bell et al. |
| 10,721,262 B2 | 7/2020 | Zorlular et al. |
| 10,742,676 B2 | 8/2020 | Mahaffey et al. |
| 10,778,701 B2 | 9/2020 | Perilli |
| 10,848,515 B1* | 11/2020 | Pokhrel ............... H04L 63/1433 |
| 10,855,700 B1 | 12/2020 | Jeyaraman et al. |
| 10,862,907 B1 | 12/2020 | Pon et al. |
| 10,873,597 B1 | 12/2020 | Mehra et al. |
| 11,265,292 B1* | 3/2022 | Leviseur ............... H04L 63/0263 |
| 11,425,148 B2 | 8/2022 | Zawoad et al. |
| 2002/0161862 A1 | 10/2002 | Horvitz |
| 2003/0009696 A1 | 1/2003 | Bunker et al. |
| 2003/0028803 A1 | 2/2003 | Bunker et al. |
| 2004/0193918 A1 | 9/2004 | Green et al. |
| 2006/0074858 A1 | 4/2006 | Etzold et al. |
| 2006/0107321 A1 | 5/2006 | Tzadikario |
| 2006/0224898 A1 | 10/2006 | Ahmed |
| 2006/0253582 A1 | 11/2006 | Dixon et al. |
| 2007/0019543 A1 | 1/2007 | Wei et al. |
| 2007/0239999 A1 | 10/2007 | Honig et al. |
| 2008/0295173 A1 | 11/2008 | Tsvetanov |
| 2009/0077383 A1 | 3/2009 | De Monseignat et al. |
| 2009/0138342 A1 | 5/2009 | Otto et al. |
| 2009/0281852 A1 | 11/2009 | Abhari et al. |
| 2009/0292925 A1 | 11/2009 | Meisel |
| 2010/0011124 A1 | 1/2010 | Wei et al. |
| 2010/0037314 A1 | 2/2010 | Perdisci et al. |
| 2010/0076857 A1 | 3/2010 | Deo et al. |
| 2010/0115620 A1 | 5/2010 | Alme |
| 2010/0115621 A1 | 5/2010 | Staniford et al. |
| 2010/0154059 A1 | 6/2010 | Mcnamee et al. |
| 2010/0191737 A1 | 7/2010 | Friedman et al. |
| 2010/0205665 A1 | 8/2010 | Komili et al. |
| 2010/0228731 A1 | 9/2010 | Gollapudi |
| 2010/0235918 A1 | 9/2010 | Mizrahi et al. |
| 2011/0016533 A1 | 1/2011 | Zeigler et al. |
| 2011/0083180 A1 | 4/2011 | Mashevsky et al. |
| 2011/0222787 A1 | 9/2011 | Thiemert et al. |
| 2012/0030293 A1 | 2/2012 | Bobotek |
| 2012/0079596 A1 | 3/2012 | Thomas et al. |
| 2012/0087583 A1 | 4/2012 | Yang et al. |
| 2012/0158626 A1 | 6/2012 | Zhu et al. |
| 2012/0233656 A1 | 9/2012 | Rieschick et al. |
| 2012/0291125 A1 | 11/2012 | Maria |
| 2013/0086677 A1 | 4/2013 | Ma et al. |
| 2013/0103666 A1 | 4/2013 | Sandberg et al. |
| 2013/0111591 A1 | 5/2013 | Topan et al. |
| 2013/0117848 A1 | 5/2013 | Golshan et al. |
| 2013/0145471 A1 | 6/2013 | Richard et al. |
| 2013/0191364 A1 | 7/2013 | Kamel et al. |
| 2013/0263264 A1 | 10/2013 | Klein et al. |
| 2013/0297619 A1 | 11/2013 | Chandrasekaran et al. |
| 2013/0312097 A1 | 11/2013 | Turnbull |
| 2013/0340080 A1 | 12/2013 | Gostev et al. |
| 2014/0033307 A1 | 1/2014 | Schmidtler |
| 2014/0058854 A1 | 2/2014 | Ranganath et al. |
| 2014/0082730 A1 | 3/2014 | Vashist et al. |
| 2014/0173287 A1 | 6/2014 | Mizunuma |
| 2014/0250145 A1 | 9/2014 | Jones et al. |
| 2014/0310811 A1 | 10/2014 | Hentunen |
| 2014/0317754 A1 | 10/2014 | Niemela et al. |
| 2014/0380480 A1 | 12/2014 | Tang |
| 2015/0007250 A1 | 1/2015 | Dicato, Jr. et al. |
| 2015/0049547 A1 | 2/2015 | Kim |
| 2015/0067839 A1 | 3/2015 | Wardman et al. |
| 2015/0163242 A1 | 6/2015 | Laidlaw et al. |
| 2015/0170312 A1 | 6/2015 | Mehta et al. |
| 2015/0200962 A1 | 7/2015 | Xu et al. |
| 2015/0200963 A1 | 7/2015 | Geng et al. |
| 2015/0220735 A1 | 8/2015 | Paithane et al. |
| 2015/0295945 A1 | 10/2015 | Canzanese et al. |
| 2015/0363791 A1 | 12/2015 | Raz et al. |
| 2015/0381654 A1 | 12/2015 | Wang et al. |
| 2016/0036837 A1 | 2/2016 | Jain et al. |
| 2016/0036838 A1 | 2/2016 | Jain et al. |
| 2016/0044054 A1 | 2/2016 | Stiansen et al. |
| 2016/0055490 A1 | 2/2016 | Keren et al. |
| 2016/0065595 A1 | 3/2016 | Kim et al. |
| 2016/0080410 A1 | 3/2016 | Gorny et al. |
| 2016/0112445 A1 | 4/2016 | Abramowitz |
| 2016/0127907 A1 | 5/2016 | Baxley et al. |
| 2016/0142429 A1 | 5/2016 | Renteria |
| 2016/0149943 A1 | 5/2016 | Kaloroumakis et al. |
| 2016/0191243 A1 | 6/2016 | Manning |
| 2016/0205122 A1 | 7/2016 | Bassett |
| 2016/0205123 A1 | 7/2016 | Almurayh et al. |
| 2016/0226894 A1 | 8/2016 | Lee et al. |
| 2016/0253679 A1 | 9/2016 | Venkatraman et al. |
| 2016/0261628 A1 | 9/2016 | Doron et al. |
| 2016/0267179 A1 | 9/2016 | Mei et al. |
| 2016/0285907 A1 | 9/2016 | Nguyen et al. |
| 2016/0306974 A1 | 10/2016 | Turgeman et al. |
| 2016/0308898 A1 | 10/2016 | Teeple et al. |
| 2016/0359679 A1 | 12/2016 | Parandehgheibi et al. |

(56) References Cited

U.S. PATENT DOCUMENTS

| | | |
|---|---|---|
| 2016/0366099 A1 | 12/2016 | Jordan |
| 2017/0034211 A1 | 2/2017 | Buergi et al. |
| 2017/0078321 A1 | 3/2017 | Maylor et al. |
| 2017/0111377 A1 | 4/2017 | Park et al. |
| 2017/0134401 A1 | 5/2017 | Medvedovsky et al. |
| 2017/0142144 A1 | 5/2017 | Weinberger et al. |
| 2017/0149813 A1 | 5/2017 | Wright et al. |
| 2017/0200457 A1 | 7/2017 | Chai et al. |
| 2017/0230401 A1 | 8/2017 | Ahmed et al. |
| 2017/0244735 A1 | 8/2017 | Msbal et al. |
| 2017/0250972 A1 | 8/2017 | Ronda et al. |
| 2017/0264627 A1 | 9/2017 | Hunt et al. |
| 2017/0272471 A1 | 9/2017 | Veeramachaneni et al. |
| 2017/0279818 A1 | 9/2017 | Milazzo et al. |
| 2017/0286544 A1 | 10/2017 | Hunt et al. |
| 2017/0289187 A1 | 10/2017 | Noel et al. |
| 2017/0295157 A1 | 10/2017 | Chavez et al. |
| 2017/0295187 A1 | 10/2017 | Havelka et al. |
| 2017/0324738 A1 | 11/2017 | Hari et al. |
| 2017/0346839 A1 | 11/2017 | Peppe et al. |
| 2017/0359368 A1 | 12/2017 | Hodgman et al. |
| 2018/0012021 A1 | 1/2018 | Volkov |
| 2018/0012144 A1 | 1/2018 | Ding et al. |
| 2018/0034779 A1 | 2/2018 | Ahuja et al. |
| 2018/0063190 A1 | 3/2018 | Wright et al. |
| 2018/0069883 A1 | 3/2018 | Meshi et al. |
| 2018/0096153 A1 | 4/2018 | Dewitte et al. |
| 2018/0115573 A1 | 4/2018 | Kuo et al. |
| 2018/0144138 A1* | 5/2018 | Zhang .................. G06F 21/577 |
| 2018/0152471 A1 | 5/2018 | Jakobsson |
| 2018/0255076 A1 | 9/2018 | Paine |
| 2018/0268464 A1 | 9/2018 | Li |
| 2018/0307832 A1 | 10/2018 | Ijiro et al. |
| 2018/0309787 A1 | 10/2018 | Evron et al. |
| 2019/0089737 A1 | 3/2019 | Shayevitz et al. |
| 2019/0132348 A1 | 5/2019 | Ng et al. |
| 2019/0207973 A1 | 7/2019 | Peng |
| 2019/0373005 A1 | 12/2019 | Bassett |
| 2020/0134702 A1 | 4/2020 | Li |
| 2021/0021644 A1* | 1/2021 | Crabtree .............. G06F 16/951 |
| 2021/0311718 A1* | 10/2021 | Sinha .................. H04L 12/4641 |
| 2022/0060507 A1* | 2/2022 | Crabtree ............ H04L 63/1433 |
| 2022/0407875 A1* | 12/2022 | Prudkovskiy ....... H04L 63/0236 |

FOREIGN PATENT DOCUMENTS

| | | | |
|---|---|---|---|
| CN | 105429955 A | 3/2016 | |
| CN | 105429956 A | 3/2016 | |
| CN | 105897714 A | 8/2016 | |
| CN | 106131016 A | 11/2016 | |
| CN | 106506435 A | 3/2017 | |
| CN | 106713312 A | 5/2017 | |
| CN | 107392456 A | 11/2017 | |
| CN | 110138764 A * | 8/2019 | ............. G06F 21/55 |
| EP | 1160646 A2 | 12/2001 | |
| EP | 2410452 B1 | 1/2016 | |
| EP | 3343867 A1 * | 7/2018 | ......... G06Q 10/0635 |
| GB | 2493514 A | 2/2013 | |
| KR | 10-2007-0049514 A | 5/2007 | |
| KR | 10-1514984 B1 | 4/2015 | |
| RU | 2382400 C2 | 2/2010 | |
| RU | 107616 U1 | 8/2011 | |
| RU | 2446459 C1 | 3/2012 | |
| RU | 129279 U1 | 6/2013 | |
| RU | 2487406 C1 | 7/2013 | |
| RU | 2488880 C1 | 7/2013 | |
| RU | 2495486 C1 | 10/2013 | |
| RU | 2522019 C1 | 7/2014 | |
| RU | 2523114 C2 | 7/2014 | |
| RU | 2530210 C2 | 10/2014 | |
| RU | 2536664 C2 | 12/2014 | |
| RU | 2538292 C1 | 1/2015 | |
| RU | 2543564 C1 | 3/2015 | |
| RU | 2566329 C2 | 10/2015 | |
| RU | 2571594 C2 | 12/2015 | |
| RU | 2589310 C2 | 7/2016 | |
| RU | 164629 U1 | 9/2016 | |
| RU | 2601147 C2 | 10/2016 | |
| RU | 2607231 C2 | 1/2017 | |
| RU | 2610586 C2 | 2/2017 | |
| RU | 2613535 C1 | 3/2017 | |
| RU | 2622870 C2 | 6/2017 | |
| RU | 2625050 C1 | 7/2017 | |
| RU | 2628192 C2 | 8/2017 | |
| RU | 2634209 C1 | 10/2017 | |
| RU | 2636702 C1 | 11/2017 | |
| RU | 2670906 C9 | 12/2018 | |
| RU | 2681699 C1 | 3/2019 | |
| RU | 2697926 C1 | 8/2019 | |
| RU | 2697935 C2 | 8/2019 | |
| RU | 2722693 C1 | 6/2020 | |
| RU | 2738335 C1 | 12/2020 | |
| WO | 0245380 A2 | 6/2002 | |
| WO | 2009/026564 A1 | 2/2009 | |
| WO | 2011/045424 A1 | 4/2011 | |
| WO | 2012/015171 A2 | 2/2012 | |
| WO | 2019/010182 A1 | 1/2019 | |
| WO | 2019004503 A1 | 1/2019 | |
| WO | 2019/153384 A1 | 8/2019 | |

OTHER PUBLICATIONS

English Translation of CN105897714, © Questel—FAMPAT, Jul. 17, 2019.
English Translation of CN106506435, © Questel—FAMPAT, Jul. 26, 2019.
English Translation of CN107392456, © Questel—FAMPAT, Jul. 29, 2019.
English Translation of CN103491205, © Questel—FAMPAT, Jul. 29, 2019.
English Translation of CN106131016, © Questel—FAMPAT, Jul. 17, 2019.
Invitation to Respond to Written Opinion received Aug. 5, 2019 with regard to the counterpart SG Patent Application No. 10201900339Q.
Invitation to Respond to Written Opinion received Aug. 5, 2019 with regard to the counterpart SG Patent Application No. 10201901079U.
Invitation to Respond to Written Opinion received Jul. 31, 2019 with regard to the counterpart SG Patent Application No. 10201900335P.
Search Report with regard to the counterpart RU Patent Application No. 2018144708 completed Aug. 16, 2019.
Search Report with regard to the counterpart RU Patent Application No. 2018147431 completed Aug. 15, 2019.
English Translation of KR10-2007-0049514 (Description, Claims) retrieved on Espacenet on Oct. 15, 2019.
English Abstract of KR10-1514984 retrieved on Espacenet on Oct. 15, 2019.
Office Action with regard to the counterpart U.S. Appl. No. 16/261,854 mailed Oct. 21, 2019.
Notice of Allowance with regard to the counterpart U.S. Appl. No. 15/707,641 mailed Oct. 30, 2019.
Whyte, "DNS-based Detection of Scanning Worms in an Enterprise Network", Aug. 2004, NOSS, pp. 1-17 (Year: 2005)—Notice of Allowance with regard to the counterpart U.S. Appl. No. 15/707,641.
Office Action with regard to the counterpart U.S. Appl. No. 15/858,013 mailed Nov. 22, 2019.
Search Report with regard to the counterpart SG Patent Application No. 10201900062S mailed Dec. 5, 2019.
Search Report with regard to the counterpart SG Patent Application No. 10201900060Y mailed Dec. 5, 2019.
English Abstract for CN105429956 retrieved on Espacenet on Jan. 7, 2020.
English Abstract for CN104504307 retrieved on Espacenet on Jan. 7, 2020.
Office Action received with regard to the counterpart U.S. Appl. No. 15/858,032 mailed Apr. 6, 2020.
Office Action with regard to the counterpart U.S. Appl. No. 16/270,341 mailed May 27, 2020.

(56) References Cited

OTHER PUBLICATIONS

Notice of Allowance with regard to the counterpart U.S. Appl. No. 15/858,013 mailed May 8, 2020.
English Abstract for CN105429955 retrieved on Espacenet on Jul. 13, 2020.
European Search Report with regard to the counterpart EP Patent Application No. EP17211131 completed Apr. 12, 2018.
Search Report with regard to the counterpart RU Patent Application No. 2018101760 completed Jun. 22, 2018.
Office Action with regard to the counterpart U.S. Appl. No. 15/707,641 mailed Apr. 25, 2019.
Notice of Allowance with regard to the counterpart U.S. Appl. No. 15/858,013 mailed Jun. 10, 2020.
International Search Report and Written Opinion with regard to PCT/RU2020/000044 mailed Oct. 15, 2020.
Search Report with regard to the counterpart RU Patent Application No. 2020103269 mailed Mar. 24, 2020.
Notice of Allowance with regard to the counterpart U.S. Appl. No. 16/270,341 mailed Mar. 25, 2021.
Notice of Allowance with regard to the counterpart U.S. Appl. No. 16/239,605 mailed Jan. 25, 2021.
Office Action with regard to the counterpart U.S. Appl. No. 16/270,341 mailed Dec. 4, 2020.
Search Report with regard to the counterpart RU Patent Application No. 2019142440 completed Oct. 26, 2020.
Search Report with regard to the counterpart RU Patent Application No. 2021116850 completed Feb. 17, 2022.
1 Search Report with regard to the counterpart NL Patent Application No. 2030861 completed Dec. 16, 2022.
Search Report with regard to the counterpart RU Patent Application No. 2021115690 completed May 19, 2022.
English Abstract of RU107616 retrieved on Espacenet on Jul. 3, 2017.
European Search Report with regard to EP17180099 completed on Nov. 28, 2017.
European Search Report with regard to EP17191900 completed on Jan. 11, 2018.
Yoshioka et al., "Sandbox Analysis with Controlled Internet Connection for Observing Temporal Changes of Malware Behavior", https://www.researchgate.net/publication/254198606, 15 pages.
Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol. E93A, No. 1, pp. 210-218.
Wikipedia, "Blockchain", https://en.wikipedia.org/wiki/Blockchain, pdf document, 18 pages.
Search Report with regard to the counterpart RU Patent Application No. 2018101764 completed Jun. 29, 2018.
Search Report with regard to the counterpart RU Patent Application No. 2018101761 completed Jun. 20, 2018.
International Search Report with regard to the counterpart Patent Application No. PCT/RU2016/000526 mailed Jun. 1, 2017.
European Search Report with regard to the counterpart EP Patent Application No. EP17210904 completed May 16, 2018.
Search Report with regard to the counterpart RU Patent Application No. 2018101759 completed Sep. 7, 2018.
English Abstract of RU129279 retrieved on Espacenet on Sep. 11, 2017.
English Abstract of RU164629 retrieved on Espacenet on Sep. 11, 2017.
English Abstract of RU2538292 retrieved on Espacenet on Sep. 11, 2017.
Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.
Search Report with regard to the counterpart Patent Application No. RU2018105377 completed Oct. 15, 2018.
Search Report with regard to the counterpart RU Patent Application No. 2018101763 completed Jan. 11, 2019.
Search Report with regard to the counterpart RU Patent Application No. 2016137336 completed Jun. 6, 2017.
English Abstract of RU2522019 retrieved on Espacenet on Jan. 25, 2019.
Search Report with regard to the counterpart RU Patent Application No. 2017140501 completed Jul. 11, 2018.
Notice of Allowance with regard to the counterpart U.S. Appl. No. 17/019,730 mailed Apr. 29, 2022.
Office Action with regard to the counterpart U.S. Appl. No. 17/528,633 issued Dec. 8, 2023.

\* cited by examiner

SYSTEM AND METHOD FOR DETECTING A CYBERATTACK

CROSS-REFERENCE

The present application claims priority to a Russian Patent Application No.: 2021115690 filed on Jun. 1, 2021 and entitled "SYSTEM AND METHOD FOR EXTERNAL MONITORING A CYBERATTACK SURFACE", the content of which is incorporated herein by reference in its entirety.

FIELD

The present technology relates broadly to the field of cybersecurity; and, in particular, to systems and methods for detecting a cyberattack in a network infrastructure.

BACKGROUND

Certain prior art approaches for a network infrastructure state monitoring and warning of its possible compromise have been known.

One of such approaches includes using vulnerability scanners enabling to scan networks, computers and applications for potential security problems. This class of solutions normally includes: port scanners, tools for studying computer network topology, network service vulnerability investigation tools and script investigation tools (CGI scanners). However, all these solutions are aimed rather at research activities than at preventing the compromise of some predefined network infrastructure.

Further, U.S. Pat. No. 10,721,262-B2, issued on Jul. 21, 2020, assigned to Palantir Technologies Inc, and assigned "RESOURCE-CENTRIC NETWORK CYBER ATTACK WARNING SYSTEM" discloses a computer system that may generate alerts related to a potential cyber attack an resource of an organization. The computer system may receive activity information associated with activity on a computer network of the organization, access contextual information about the resource, determine, based on the contextual information, select, based at least in part on the contextual information, one or more indicators that are indicative of a cyber attack against the resource to form a second plurality of indicators, and generate, based at least in part on the second plurality of indicators and the contextual information, a risk score, wherein the risk score indicates a probability that the resource is at risk of a cyber attack. In response to the risk score satisfying a threshold value, the computer system may generate an alert. Alerts may be presented using a graphical user interface. Analysts' actions may be tracked for review.

U.S. Pat. No. 10,778,701-B2, issued on Sep. 15, 2020, assigned to Red Hat Inc, and entitled "MITIGATING CYBER ATTACKS BY AUTOMATICALLY COORDINATING RESPONSES FROM CYBER-SECURITY TOOLS" discloses a cyber-security engine including software modules created by multiple sources, each of the software modules being for integrating a respective cyber-security tool with the cyber-security engine. The cyber-security engine can use the software modules to communicate with the cyber-security tools in order to detect one or more events indicative of a cyber-attack against a computing environment. The cyber-security engine can then determine a coordinated-response strategy involving cooperation among the cyber-security tools to mitigate the cyber-attack. The cyber-security engine can transmit commands to the cyber-security tools to cause the cyber-security tools to implement the coordinated-response strategy.

United States Patent Application Publication No. 2016/0308,898-A1, published on Oct. 20, 2016, assigned to Mantix4 LLC, and entitled "SYSTEMS AND METHODS FOR TRACKING, ANALYZING AND MITIGATING SECURITY THREATS IN NETWORKS VIA A NETWORK TRAFFIC ANALYSIS PLATFORM" discloses a network traffic analysis method for tracking, analyzing, and mitigating security threats in a network includes receiving information based on monitoring traffic at a plurality of layers at one or more monitors deployed in the network utilizing deep packet inspection; receiving information based on monitoring the traffic at an endpoint of the network; analyzing the monitored traffic from the endpoint and the one or more monitors to determine network infrastructure and cyber security posture of the network infrastructure; and providing visualizations based on the network infrastructure and the cyber security posture, continuously to track threats, watch lateral movement in the network of the traffic, and determine security event history in the network.

U.S. Pat. No. 10,873,597-B1, issued on Dec. 22, 2020, assigned to FireEye Inc, and entitled "CYBER ATTACK EARLY WARNING SYSTEM" discloses a system and method for generating an alert regarding a potential attack. The method involves receiving data associated with previously analyzed or known malware attacks by a first network device. Additionally, the first network device receives an attack alert associated with an object analyzed and identified as suspicious by a second network device. The attack alert includes information associated with the suspicious object. For alert generation, at least a portion of the information of the attack alert is provided to a system configured to at least (i) extract feature(s) from the attack alert, (ii) determine similarities between the extracted features and features associated with the previously analyzed or known malware attacks to determine a result, (iv) compute an attack value based on the result and at least a portion of the extracted features including time-dependent and/or independent features, and (v) generate an alert based on the attack value.

U.S. Pat. No. 7,930,256-B2, issued on Apr. 19, 2011, assigned to Charles River Analytics Inc, and entitled "SECURITY SYSTEM FOR AND METHOD OF DETECTING AND RESPONDING TO CYBER ATTACKS ON LARGE NETWORK SYSTEMS" discloses a security system for and method of detecting and responding to cyber attacks on a network or network element. The system comprises: (a) an intelligent agent-based information retrieval subsystem configured so as to automatically search for and retrieve relevant data from distributed sources; (b) a rule-based inferencing mechanism configured so as to interpret retrieved data within the situational context to support event and alert generation for cyber threat assessment and prediction; and (c) a threat assessment and prediction mechanism configured so as to capture relating to the interrelationship between cyber sensor outputs and cyber attacks.

SUMMARY

It is an object of the present technology to ameliorate at least inconveniences associated with the prior art.

Unlike the prior art solutions, the methods and systems described herein are directed to monitoring a network infrastructure from the outside thereof. More specifically, the present methods are directed to identifying indicators of compromise within the network infrastructure by analyzing elements thereof represented as a graph, which can be obtained from the outside of the network infrastructure, such as from a graph structure representative of a network including the network infrastructure. By doing so, non-limiting embodiments of the present technology allow detecting cyberattacks in the network infrastructure without integration therein.

More specifically, in accordance with a first broad aspect of the present technology, there is provided a method for detecting a cyberattack in a network infrastructure. The method is executable by a computing device including a processor communicatively couplable to the network infrastructure. The network infrastructure has an infrastructure external perimeter, and the computing device is disposed externally with respect to the infrastructure external perimeter. The method comprises: obtaining, by the processor, data representative of a given protected infrastructure element; accessing, by the processor, a network graph representative of a network including the network infrastructure to identify in the network graph, based on the given protected infrastructure element, an infrastructure graph representative of the network infrastructure, a given vertex of the infrastructure graph being representative of a respective one of linked infrastructure elements associated to the given protected infrastructure element in the network infrastructure; and a given edge connecting two adjacent vertices being representative of a respective common parameter between respective infrastructure elements associated with the adjacent nodes; analyzing, by the processor, a given one of the linked infrastructure elements associated to the given protected infrastructure element to determine a respective value thereof; determining, by the processor, whether the respective value of the given one of the linked infrastructure elements is indicative of the network infrastructure being compromised; in response to the respective value of any one of the linked infrastructure elements associated to the given protected infrastructure element being indicative of the network infrastructure being compromised: generating, by the processor, at least one warning about a potential cyberattack, and transmitting, by the processor, the at least one warning cyberattack to an operator of the network infrastructure.

In some implementation of the method, the given protected infrastructure element comprises at least one of:
 a domain,
 an IP address,
 an SSL certificate,
 an e-mail address,
 an FTP server address,
 a database management system address,
 a file hosting web service address, and
 a name of a web service and a respective port in which the web is running.

In some implementation of the method, the respective one of the linked infrastructure elements associated with the given protected infrastructure element comprises at least one of:
 an other domain,
 an other IP address,
 an other SSL certificate,
 an other TLS certificate,
 a name and a respective version numbers of an other web service, and
 a link to at least one web page associated with the given protected infrastructure element.

In some implementation of the method, identifying the network infrastructure graph comprises scanning the given protected infrastructure element with a port scanner.

In some implementation of the method, the respective value of the given one of the linked infrastructure elements comprises at least one of:
 Domain Name System (DNS) resource record values,
 a value of a domain name system record comprising DMARC protocol settings,
 an IP address owner company name,
 an IP address hosting provider,
 an IP address validity period,
 a list of ports opened on an IP address associated with the given protected infrastructure element,
 a list of network services running on the IP address,
 a name of a domain owner,
 a domain registrar,
 a domain validity period,
 statuses of one of the SSL and TLS certificate,
 parameters of one of the SSL and TLS certificate including data of encryption algorithms;
 a validity period of one of the SSL and TLS certificate,
 a security status of a web page associated with the given protected infrastructure element, and
 length of a list of links to web pages including high-risk content.

In some implementation of the method, indicators of the network infrastructure being compromised includes at least one:
 change of DNS data,
 DNS malfunctioning,
 change of an IP-address owner,
 change of a domain name owner,
 change of a SSL certificate status,
 change of a TLS certificate status,
 at least one of SSL encryption algorithms being determined as being a weak SSL encryption algorithm,
 at least one TLS encryption algorithm being determined as being a weak TLS encryption algorithm,
 missing or incorrect configuration of DMARC protocol,
 opening a new port,
 launching a new service,
 absence of a launched service in a list of known legitimate services,
 a version of a launched legitimate service being determined as being known vulnerable version,
 receiving, in response to a test request, from a legitimate web service, any other response, except for "Authorization Error" response,
 an expired domain name,
 an expired SSL certificate,
 an expired TLS certificate,
 detection of at least one web page associated with the given protected infrastructure element with illegal content,
 detection of a malicious code on at least one web page associated with the given protected infrastructure element,
 detection of at least one access of at least one of devices associated with the given protected infrastructure element to at least one command server of intruders,
 detection of at least one command server of intruders within the protected infrastructure.

In some implementation of the method, the DNS malfunctioning comprises at least one of:
- receiving no DNS responds to respective queries,
- at least one of DNS responding within a time longer than a predetermined time,
- at least one of DNS not declaring itself authoritative,
- Domain Name System Security Extensions (DNSSEC) being not supported for a domain associated with the given protected infrastructure element,
- DNS list provided by a root server not corresponding to a list published by the DNS,
- only one DNS being associated with the domain of the given protected infrastructure element,
- at least one DNS being capable of responding to any DNS lookup from any IP,
- at least one DNS being an Open Zone Transfer Server providing information in a DNS zone,
- at least one DNS server having a private IP address,
- no published DNS record being identified for the domain or a host name associated with the given protected infrastructure element,
- more than one DNS being present on a same C class subnet,
- a DNS SOA validity period being different from that recommended by a Request for Comments (RFC),
- a DNS SOA cache value being different from that recommended by the RFC,
- a DNS SOA update value being different from that recommended by the RFC,
- a DNS SOA retry value being different from that recommended by the RFC,
- SOA serial numbers mismatching, and
- an invalid format of DNS SOA serial number.

In some implementation of the method, the indicators of the network infrastructure being compromised further includes information about sensitive data leaks in the network infrastructure.

In some implementation of the method, the method further comprising determining if the information about sensitive data leaks include protected infrastructure sensitive data, and in response to detection of at least one leak of the protected infrastructure sensitive data, the method further comprises generating the at least one warning about the potential cyberattack.

In some implementation of the method, the protected infrastructure sensitive data comprise at least one of:
- credentials of users of the network infrastructure,
- personal data of the users of the network infrastructure,
- contact details of the users of the network infrastructure,
- payment details of the users of the network infrastructure, and confidential information stored on the protected infrastructure devices.

In some implementation of the method, the at least one generated cyberattack warning is transmitted to an electronic device of the operator of the network infrastructure via at least one of:
- an e-mail,
- an SMS,
- an MMS,
- a push notifications,
- an instant messenger messages, and
- an API events.

In accordance with a second broad aspect of the present technology, there is provided a computing device for detecting a cyberattack in a network infrastructure. The network infrastructure has an infrastructure external perimeter, and the computing device is disposed externally with respect to the infrastructure external perimeter. The computing device includes: a processor communicatively couplable to the network infrastructure and non-transitory computer-readable medium storing instructions. The processor, upon executing the instructions, is configured to: obtain data representative of a given protected infrastructure element; access a network graph representative of a network including the network infrastructure to identify in the network graph, based on the given protected infrastructure element, an infrastructure graph representative of the network infrastructure, a given vertex of the infrastructure graph being representative of a respective one of linked infrastructure elements associated to the given protected infrastructure element in the network infrastructure; and a given edge connecting two adjacent vertices being representative of a respective common parameter between respective infrastructure elements associated with the adjacent nodes; analyze a given one of the linked infrastructure elements associated to the given protected infrastructure element to determine a respective value thereof; determine whether the respective value of the given one of the linked infrastructure elements is indicative of the network infrastructure being compromised; in response to the respective value of any one of the linked infrastructure elements associated to the given protected infrastructure element being indicative of the network infrastructure being compromised: generate at least one warning about a potential cyberattack, and transmit the at least one warning cyberattack to an operator of the network infrastructure.

In the context of the present specification, "an external attack surface" or "cyberattack surface" of a cyberattack executed in a network infrastructure denotes a set of all potentially vulnerable elements of the network infrastructure, such as hardware and software solutions present therein (for example, ports open on a server and web services running on it), and also individual properties and parameters of these elements (for example, SSL certificate and its validity period, server IP address and registration data of its owner, user account name and password, etc.).

Collectively, these potentially vulnerable elements, and also their properties and parameters, which are monitored, according to certain non-limiting embodiments, within the scope of this specification will be also be referred to as "checkpoints" of the network infrastructure. In other words, a cyberattack external surface consists of a set of the protected network infrastructure checkpoints.

Further, in the context of the present specification, the term "network infrastructure" denotes a computer system including a set of software and hardware interconnected by a network, providing for data communication, which could be targeted by cyber criminals, or intruders. Such network infrastructure, for example, can include a company computer network containing servers, workstations, routers, etc.

In the context of the present specification, unless expressly provided otherwise, a computer system may refer, but is not limited, to an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF THE DRAWINGS

Non-limiting embodiments of the present technology are described herein with reference to the accompanying drawings; these drawings are only presented herein to explain the essence of the technology and are not intended to limit the scope thereof in any way, where.

DETAILED DESCRIPTION

The following detailed description is provided to enable anyone skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

System

Figure 1:
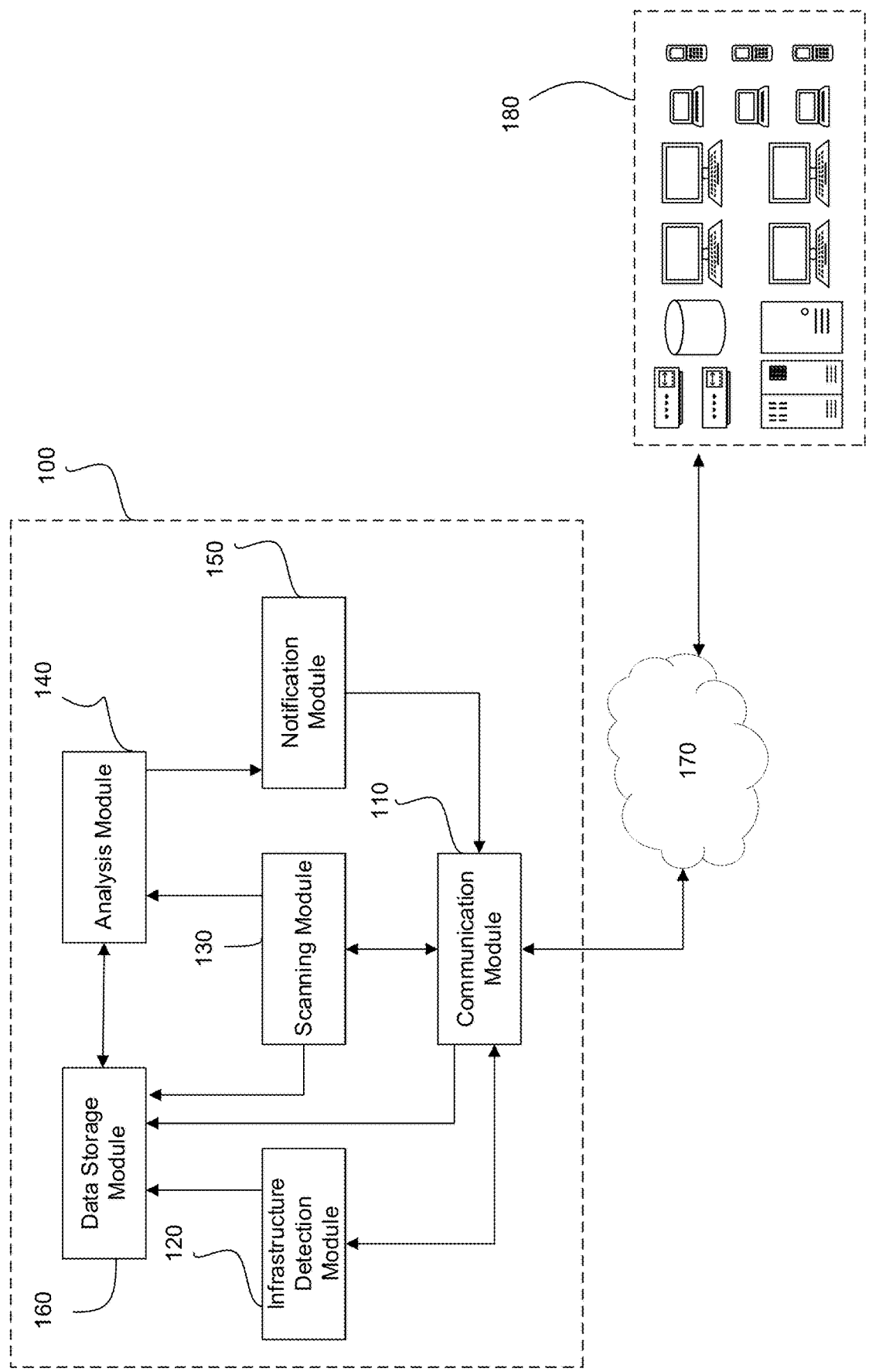
FIG. 1 depicts a schematic diagram of a computing device configurable for detecting a cyberattack in a network infrastructure, in accordance with certain non-limiting embodiments of the present technology.

With reference to FIG. 1, there is depicted a schematic diagram of a computing device 100 configured for implementing the present method for detecting a cyberattack in a network infrastructure 180, in accordance with certain non-limiting embodiments of the present technology. As it can be appreciated, the computing device 100 is positioned outside the network infrastructure 180. According to certain non-limiting embodiments of the present technology, the computing device 100 can be configured to be coupled to the network infrastructure 180 via a communication network 170, such as the Internet. FigureDesign and hardware configuration of the computing device 100 could be any generally known ones enabling to ensure execution of the functions described below. For example, and not as a limitation, the computing device 100 can be implemented as a server. For example, the server can comprise a hardware server Dell™ PowerEdge™ server. In the alternative embodiment, the functionality of the computing device (100) could be implemented by a plurality of servers. In the other non-limiting embodiments of the present technology, the computing device 100 can comprise a mobile electronic device, for example, a smartphone or tablet. To that end, the computing device 100 can include some or all components of a computing environment 500, such as a processor 501 thereof, which will be described in detail below with reference to FIG. 5.

According to certain non-limiting embodiments of the present technology, the computing device 100 can include at least one of the following components: a communication module (110), an infrastructure detection module (120), a scanning module (130), an analysis module (140), a notification module (150), and a data storage module (160).

The listed modules in terms of their technical implementation could be software modules executed on one computing device; however, in other non-limiting embodiments of the present technology, at least some of these software and hardware modules could be implemented as dedicated servers, each of which can be configured to perform a corresponding function.

According to certain non-limiting embodiments of the present technology, the communication module (110) is configured to exchange data with the infrastructure detection module (120), the scanning module (130), the notification module (150), and also the data storage module (160). The communication module (110) enables the computing device implementing the present method to communicate with the communication network 170. In turn, the communication module 110 provides communication between the computing device (100) with the network infrastructure (180) via the communication network 170. Moreover, the communication module (110) enables the computing device (100) to obtain additional information, in particular, indicators of compromise via the communication network 170.

The infrastructure detection module (120) is configured to exchange data with the communication module (110) and the data storage module (160). The infrastructure detection module (120) is configured to search for and identify infrastructure elements (also referred to herein as "checkpoints") of the network infrastructure 180 defining a cyberattack surface of the network infrastructure (180). Such checkpoints, according to certain non-limiting embodiments of the present technology, can include, at least, domain names, IP addresses, SSL and TLS certificates, open port numbers, and also names and version numbers of web services running on those ports. One of the possible embodiments of these functions by the infrastructure detection module (120) is described below with reference to FIGS. 2 to 3B.

Further, in some non-limiting embodiments of the present technology, the scanning module (130) is configured to exchange data with the communication module (110) and the data storage module (160). The scanning module (130) is also configured to scan the network infrastructure devices (180) and obtain information about the web services running on the ports of its devices. The scanning module (130) provides scanning of the checkpoints of the network infrastructure 180 and obtaining information about their statuses, i.e., parameters characterizing the current state of the checkpoints. If the checkpoint is a domain name, for example, company.com, the information about this checkpoint statuses may include, by way of non-limiting example, at least one of: IP address to which the given domain name is resolved, settings of at least one DNS corresponding to the given domain name, names and numbers of software versions (web services) operating on the server having the given domain name, domain name owner (registrar), its address, contact phone number, its e-mail address, date of domain name registration, validity period of domain name registration, domain name current status (for example, "active"), and also date of the last change of all the listed parameters.

The analysis module (140) is configured to exchange data with the scanning module (130), data storage module (160) and notification module (150). The analysis module (140) is configured to check the information about the statuses of the checkpoints of the network infrastructure (180), received from the scanning module (130), for vulnerabilities, unsafe settings and other indicators of compromise in it.

The notification module (150) is configured to exchange data with the analysis module (140) and with the communication module (110). The notification module (150) generates and transmits, using the communication module (110), the notification of a potential compromise of the network infrastructure 180, such as to an electronic device of an operator thereof, as an example, by at least one of the following communication means: an e-mail, an SMS/MMS, a push notification, a message in an instant messenger by creating an API event.

The data storage module (160) is configured to exchange data with the communication module (110), the infrastructure detection module (120), the scanning module (130) and the analysis module (150). The data storage module (160) provides both permanent and temporary storage of information. For this purpose, the data storage module (160) comprises at least one database (not depicted in FIG. 1), which allows to store information orderly and to carry out search efficiently. The data storage module (160) could also be configured to store program instructions, which execution enables the processor 501 of the computing device (100) to implement the described method.

Method

Figure 2:
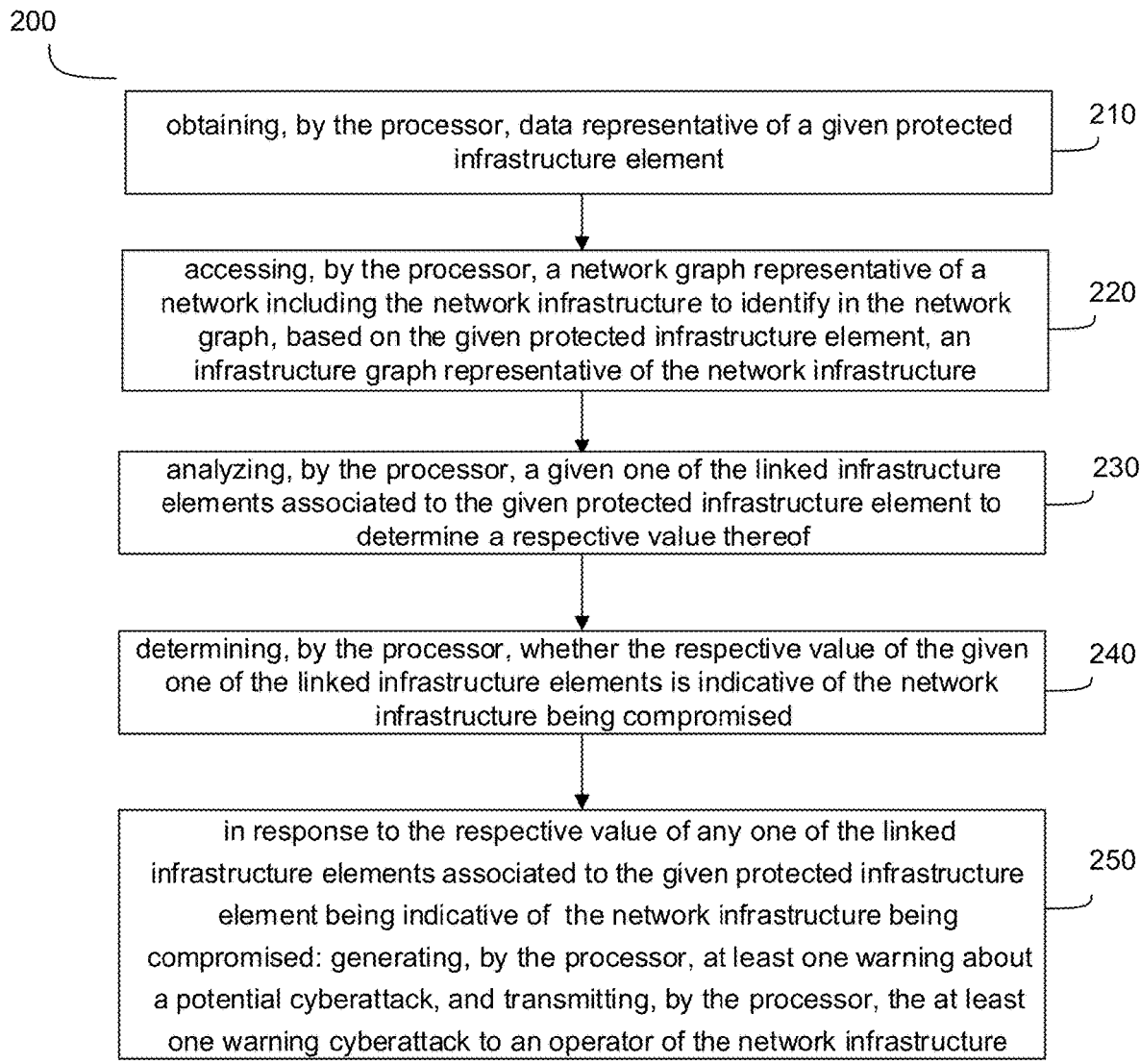
FIG. 2 depicts flowchart of a method detecting a cyberattack in a network infrastructure, in accordance with certain non-limiting embodiments of the present technology.

With reference to FIG. 2, there is depicted a flowchart diagram of a method 200 for detecting the cyberattack in a given protected network infrastructure, such as the network infrastructure 180, in accordance with certain non-limiting embodiments of the present technology. As mentioned above, the method 200 can be executed by the processor 501 of the computing device 100 positioned outside a perimeter of the network infrastructure 180 and couplable thereto via the communication network 170.

Step 210: Obtaining, by the Processor, Data Representative of a Given Protected Infrastructure Element The method (200) begins at step (210), when, using the communication module (110), the processor 501 can be configured to (1) obtain data on a given protected infrastructure element are obtained and (2) store the data in the database of the data storage module (160).

According to certain non-limiting embodiments of the present technology, the data on the given protected infrastructure element can include at least one of: domain or IP-address related to at least one website being part of the network infrastructure 180, at least one SSL certificate installed therein, or on at least one IP address, email address related to a webmail service operating in the network infrastructure 180, for example, a corporate email address. Besides, the basic data may include locators, for example, links to data stores that are present in the protected infrastructure, in one non-limiting example, these could be: FTP servers, database management systems such as MongoDB, file hosting web services such as AWS bucket storages, etc. Additionally, the data on the given protected infrastructure element may include addresses, identifiers and version numbers of web services operating in the network infrastructure 180.

In this case, a given web service address is a server IP address and number of a port where a respective web service is running. The service identifier could be, without limitation, as the web service name, for example, Apache Tomcat, as a conventional symbol, for example, a pre-assigned web service serial number, or a number resulting from taking a hash function, for example, from the character string of the web service name. The web service version number is the software version number traditionally used in IT industry.

Thus, by way of example, at step (210), the processor 501 can be configured to obtain the data indicative of given protected infrastructure element including the domain "company.com".

Further, at step (210), the processor 501, using the communication module (110), can be configured to obtain and store data on indicators of compromise associated with the given protected infrastructure element in the database of the data storage module (160).

It is worth noting that within the scope of this specification, the term "indicator of compromise" denotes artifacts directly indicating the fact of compromise (for example, presence of an entry typical of the known malicious program in the system registry) as well as checkpoint status values, which indicate a change in the state of the particular checkpoint.

For example, indicators of compromise associated with the given protected infrastructure element can include, without limitation, change of DNS data, change of IP-address owner, change of domain name owner, change of SSL certificate status, change of TLS certificate status, opening a new port, launching a new service, domain name expiration, SSL certificate expiration, TLS certificate expiration, absence of the detected software (web service) name in the list of legitimate software, belonging of the used legitimate service (web service) version to the known vulnerable versions being used belongs to the known vulnerable versions of this service, missing or incorrect configuration of DMARC protocol, use of encryption algorithms related to weak algorithms in SSL/TLS, and leak of sensitive data.

Such sensitive data, according to certain non-limiting embodiments of the present technology, mean at least the following: credentials of users of the network infrastructure 180, personal data including contact details thereof, further including business email addresses, payment details of the users. Additionally, the sensitive data can include other confidential and sensitive information stored inside the perimeter of the network infrastructure 180, for example, databases, file storages, network shared folders, etc.

Further, according to certain non-limiting embodiments of the present technology, the indicators of compromise obtained by the processor 501 at step (210), that is, objects or artifacts associated with the given protected infrastructure element, can be indicative of the network infrastructure 180 being compromised, such as by the cyberattack. The indicators of compromise can represent, for example, hash sums of malicious files, names of malicious files and the paths where they are located, IP addresses of malware command servers accessed by one of devices of the network infrastructure 180, addresses of DNS servers used by the malware, etc.

Further, the indicators of compromise obtained at this step may also include information about sensitive data leaks, for example, names of companies, the illegal access to which infrastructure has been put up for sale on specialized forums used by cybercriminals, and also information about such companies' employees' credentials, personal, payment details, and the like.

In some non-limiting embodiments of the present technology, the processor 501 can be configured to store the indicators of compromise in text files, in a form of a list, or otherwise in an ordered data structure, such as a separate database of in any suitable format.

It should be expressly understood that the processor 501 of the computing device 100 can be configured to obtain the above information in advance from any suitable source, for example, from open third-party sources of cyber intelligence data (threat intelligence feeds), from the results of traffic or malicious file code analysis performed, for example, by a third-party platform for malicious files detonation or by a virtual environment, sandbox, third-party tools for the malicious file code analysis, etc. Such information could be provided to the computing device 100 implementing the method (200), at the first step (210) thereof. In some non-limiting embodiments of the present technology, the processor 501 can be configured to obtain and store, in the database of the data storage module (160), the data about the indicators of compromise from time to time, such as at predetermined intervals, for example, once a day, or, for example, every four hours.

The method 200 thus advances to step 220.

Step 220: Accessing, by the Processor, a Network Graph Representative of a Network Including the Network Infrastructure to Identify in the Network Graph, Based on the Given Protected Infrastructure Element, an Infrastructure Graph Representative of the Network Infrastructure At step (220), according to certain non-limiting embodiments of the present technology, the processor 501 can be configured to determine at least one other infrastructure element the are linked to the given protected infrastructure element data of which that processor obtained at step 210. For example, the processor 501 can be configured to identify, using the infrastructure detection module (120), at last one of the related domain names, IP addresses, SSL- and\or TLS certificates that are associated with the given protected infrastructure element in the network infrastructure 180.

Figure 3A:
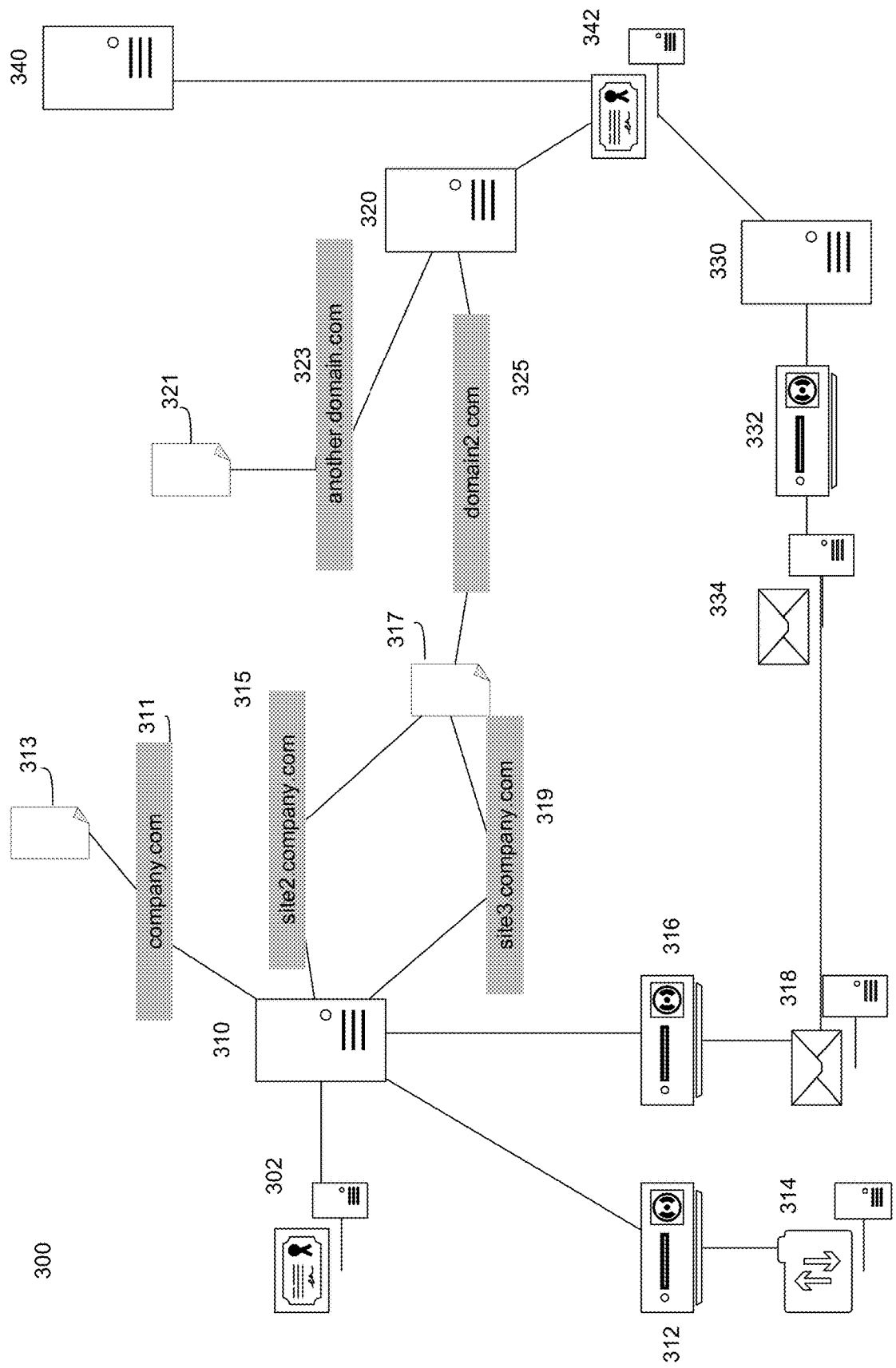
FIG. 3A depicts an example of a fragment of the Internet graph model used for identifying the network infrastructure of FIG. 1, in accordance with certain non-limiting embodiments of the present technology.

To that end, in some non-limiting embodiments of the present technology, the processor 501 can be configured to access, using the infrastructure detection module (120), a pre-built Internet graph model to identify therein an infrastructure graph representative of the network infrastructure 180. With reference to FIG. 3A, there is depicted a schematic diagram of a non-limiting example of an Internet graph model 300, in accordance with certain non-limiting embodiments of the present technology. could be built in one of the possible embodiments. It is worth noting that the Internet graph model 300 a simplified example which is provided solely for ease of understanding of the non-limiting embodiments of the present technology; and in actual Internet graph model can include a much greater number of graph vertices, such as thousands, millions, or event billions, as an example.

As best illustrated in FIG. 3A, the Internet graph model (300) is a graph, whose vertices are representative of infrastructure elements of the network infrastructure 180 and the parameters of these elements. Such elements of the network infrastructure 180 can include, for example, IP addresses (310), (320), (330), (340), domains (311), (315), (319), (323), (325), ports (312), (316), (332), web services running on these ports (314), (318), (334), SSL and TLS certificates (313), (317), (321) etc. The parameters of the elements of the network infrastructure 180 could be, for example, owners of IP addresses (302), (342), dates of IP address registration (not shown), dates of SSL and TLS certificates creation and expiration (not shown), etc.

According to certain non-limiting embodiments of the present technology, the processor 501 can be configured to identify the graph vertices at the stage of model building while crawling the communication network 170. This crawling enables to obtain information about availability, status and parameters of each of the listed elements of the network infrastructure 180.

The graph edges are the links identified during analysis of the said Internet crawling results. In this case, a link corresponds to a match of parameters of different elements of the network infrastructure 180. Building links between the vertices could be executed by any well-known method, for example, as described in patent RU2681699 issued on Mar. 12, 2019, assigned to Trust LLC, and entitled "METHOD AND SERVER FOR SEARCHING RELATED NETWORK RESOURCES", where identifying at least first linked element (corresponding to a respective graph vertex) and at least second linked element second network resource (corresponding to a respective other graph vertex); retrieving information about the identified network infrastructure elements, including at least one parameter of the at least first linked element and at least one parameter of the at least second linked element; and in response to the fact that at least one parameter of the at least first linked element matches at least one parameter of the at least second linked element, building a link between the at least first linked element resource and the at least second linked element (an edge between two vertices of the graph).

Thus, with continued reference to FIG. 3A, the processor 501 can be configured to determine links between the graph vertices corresponding to the IP addresses (320), (330) and (340) since these three addresses belong to one and the same owner (342). Further, the processor 501 can be configured to determine links between vertices corresponding to domains (315), (319) and (325) because one and the same SSL certificate (317) is installed on the websites having these domain names.

Further, the processor 501 can be configured to establish links between the vertices corresponding to domains (315) and (319) since both of these domain names refer to one and the same IP address (310). Similarly, the processor 501 can be configured to establish links between the vertices corresponding to domains (323) and (325), since both of these domain names refer to one and the same IP address (320).

Further, the processor 501 can be configured to establish a link between the graph vertices corresponding to the port (316) opened at IP address (310) and port (332) opened at IP address (330), since the same web services (318), (334) are running on these ports, for example, Apache Tomcat web servers of the same v.3.3.2 version.

In additional non-limiting embodiments of the present technology, the processor 501 can be configured to assign, to each of the so determined links in the Internet graph model (300), a respective weight value indicative of "strength" of the link or some other parameters of the associated vertices. Determining or assignment, by the processor 501, of these values could be performed by any well-known method. In one non-limiting example, a link could have a greater respective weight value if it connects less elements; for example, the link between the IP address (310) and the owner of that address (302) could have a greater respective weight value than the links between the IP addresses (320), (330), (340) and their owner (342).

However, it should be noted that the respective weight values can be assigned, by the processor 501, to each graph edge based on other parameters as well. For example, links built from vertices corresponding to SSL certificates could have greater weight values than links built from vertices corresponding to the same web services, such as web services (318), (334). Any other known methods of computing or assigning weights to the edges of such a graph are possible without limitations.

The above-described Internet graph model 300 could be configured to be periodically replenished or enriched. The graph model replenishment or enrichment could be performed, by the processor 501, for example, by re-crawling the communication network 170 and analyzing the obtained data by the above-described method, as well as by alternative methods, without departing from the scope of the present technology.

For example, in some non-limiting embodiments of the present technology, the processor 501 can be configured to analyze the lists of domains published by domain registrars, and thus identify new domains. In another example, the processor 501 can be configured to analyze network traffic on the communication network 170 and extract new domain names from it. In the other example, the processor 501 can be configured to extract new domains from SSL certificate data, and also from the code or traffic of malicious files analyzed by third-party systems. Similarly, in yet another example, the processor 501 can be configured to analyze the lists of the issued SSL and TLS certificates, thus obtaining information about new certificates and domains, and enriching the graph model. Also, the processor 501 can be configured any method to conduct the above-mentioned analysis of the lists, network traffic, malicious file code and certificates without departing from the scope of the present technology.

The Internet graph model 300, created in advance and constantly replenished in this way, is a part of the infrastructure detection module (120), using which, at step (220), the processor 501 can be configured to identify the checkpoints of the network infrastructure (180), namely, the related domain names, IP addresses, SSL- and/or TLS certificates, open ports and web services running on these ports, associated with the given protected infrastructure element.

With continued reference to FIG. 3A, returning to the example where the given protected infrastructure element was the company.com. domain (311), the processor 501 can be configured to identify the specified company.com domain (311) in the Internet graph model 300, as described above.

Further, the processor 501 can be configured to identify a graph model fragment comprising all the elements, in some way or other associated with the domain (311). In other words, the processor 501 can be configured to identify vertices of the Internet graph model 300 that are linked to that representative of the domain (311). In the other possible embodiment, the processor 501 can be configured to identify those elements that are connected to the original element of the network infrastructure 180 with such a number of edges that does not exceed a predetermined threshold value, for example, elements connected to the original element of the network infrastructure 180 with no more than 500 edges (links). The identified fragment of the Internet graph model 300 may look, for example, as shown in FIG. 3A.

Further, the processor 501 can be configured to filter out vertices from the so identified fragment of the Internet graph model 300. For example, the processor 501 can be configured to cuts off those graph edges (links) whose respective weight values are less than a predetermined threshold value.

Figure 3B:
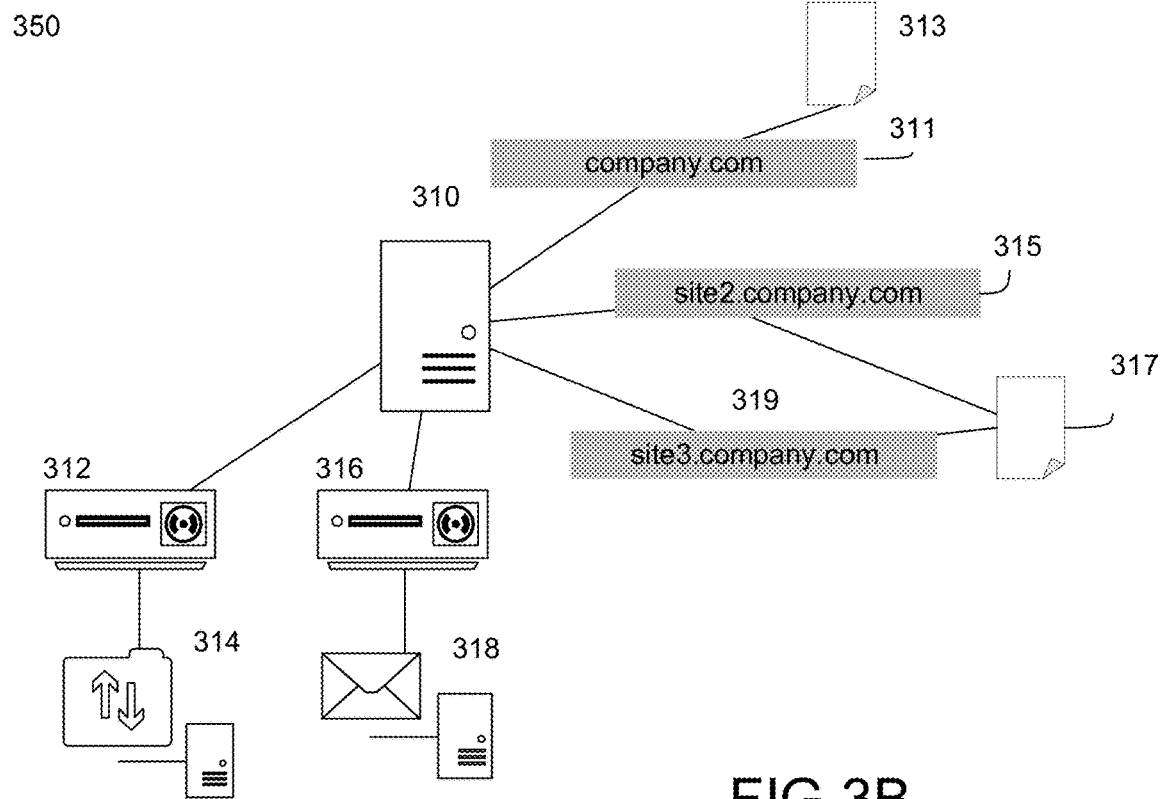
FIG. 3B depicts an example of a filtered fragment of the of the Internet graph model of FIG. 3A, in accordance with certain non-limiting embodiments of the present technology.

Thus, the processor 501 can be configured to generate a cleared fragment (350) schematically depicted in FIG. 3B, in accordance with certain non-limiting embodiments of the present technology. As it can be appreciated, the processor 501 has been identified linked infrastructure elements associated with the given protected infrastructure element, that is, the company.com domain 311, including two additional domains, (315) and (319), two SSL certificates (313) and (317), IP address (310) of the server 111.222.333.444 and addresses of two open ports on this server, where network services are running: port 111.222.333.444:69 (312), where the FTP server (314) Cisco TFTP Server v.1.1 is running, and port 111.222. 333.444: 8080 (316), where the web server (318) Apache Tomcat v.3.3.2 is running.

Then, in additional non-limiting embodiments of the present technology, the processor 501 can be configured to scan each one of the so identified linked infrastructure elements, using the scanning module (130). By doing so, the processor 501 can be configured to obtain more complete information about the composition of the network infrastructure 180. This scanning of the network infrastructure 180 can be performed once or several times. How the scanning can be implemented will be described in greater detail at step 230 of the method 200.

Figure 3C:
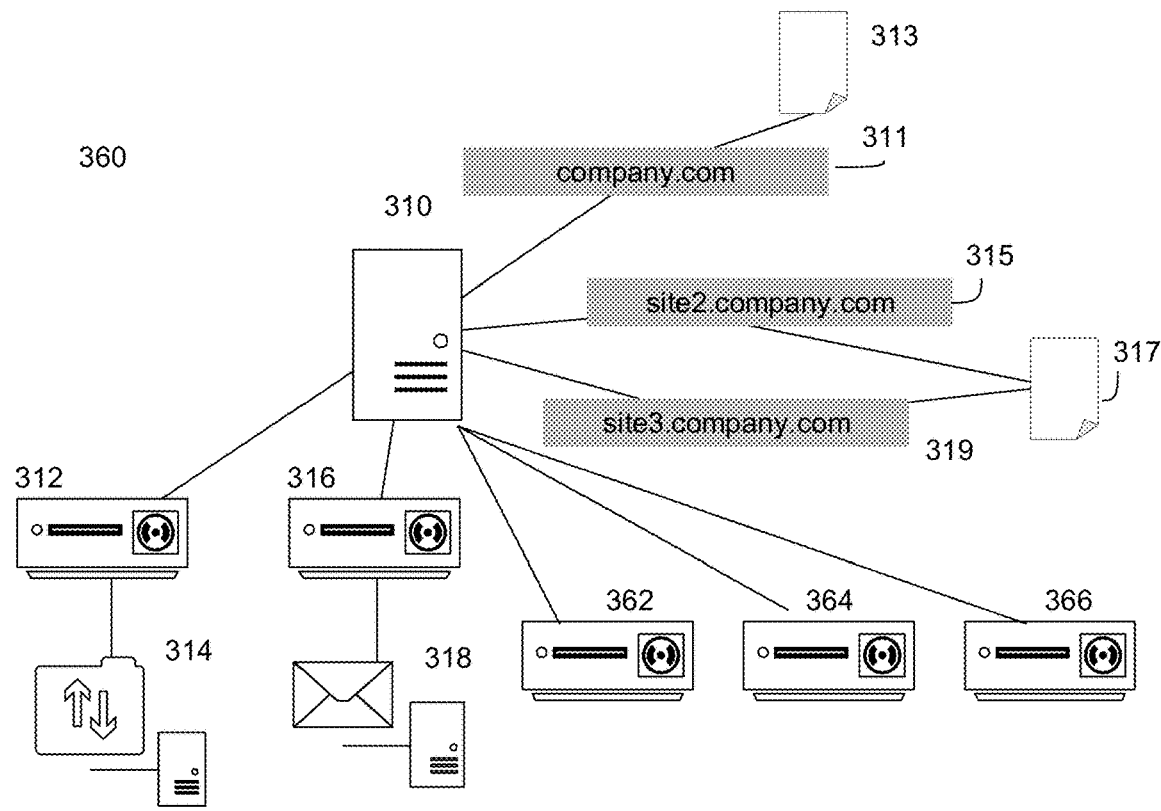
FIG. 3C depicts an example of the filtered fragment of the of the Internet graph model of FIG. 3B, which has been additionally enriched, in accordance with certain non-limiting embodiments of the present technology.

For example, as shown in FIG. 3C, an enriched fragment 360 of the Internet graph model 300 includes vertices representative of port 111.222.333.444:22 (362), port 111.222.333.444:443 (364) and port 111.222.333.444: 50050 (366), identified, by the processor 501, during the scanning. This drawing also illustrates the fact that identifying open ports has been succeeded, but names and versions of the web services running on these ports remained unknown.

In yet additional non-limiting embodiments of the present technology, the processor 501 can be configured detect web pages to be analyzed and monitored and related to the protected infrastructure domains, using the infrastructure detection module (120). For this purpose, for each domain identified in the network infrastructure 180, the processor 501 can be configured to retrieve at least one web page related to a given domain i, and analyze content of this at least one web page.

To retrieve the at least one web page, the processor 501 can be configured to apply by any well-known method. In one non-limiting example, the processor 501 can be configured to utilize a suitable utility that, according to a specified domain name, generates a list of web pages associated with that domain name, for example, such as SiteAnalyzer utility. In the other non-limiting example, the processor 501 can be configured to use a crawling algorithm (identifying the related web pages). In the other non-limiting example, the list of web pages to be analyzed and monitored can be obtained in advance by the computing device 100 and stored in the database of the data storage module (160).

According to certain non-limiting embodiments of the present technology, the processor 501 can be configured to analyze the so identified web pages in two phases. During the first phase, the processor 501 analyzes the subject matter of the content posted on each web page and identify the content categories which the analyzed web pages fall into.

By way of non-limiting example, the processor 501 can be configured to identify the subject matter of the analyzed web pages by applying one of approaches described in Russian Patent No.: 2,738,335-C1 issued on Dec. 11, 2020, assigned to Group-IB LLC, and entitled "METHOD AND SYSTEM FOR CLASSIFYING AND FILTERING PROHIBITED CONTENT IN A NETWORK". More specifically, the processor 501 can be configured to: form a pool of web pages so that the pool includes a sufficient number of web pages, which content falls into each of the categories subject to monitoring, for example, such as "authorization", "payments and transfers" (i.e., pages designed for entering sensitive data), "adult content", "gambling", "drugs" (pages containing high-risk content),"business", "medicine", "leisure", and so on (pages of all other types). Then the content of web pages is converted from HTML into text, the text is tokenized, a token matrix is formed for training classifier ensemble, and an ensemble of classifiers is created on the basis of the resulting token matrix, and a decisive priority is predetermined for each of them. In this case, text tokenization denotes exclusion of punctuation from it, conversion of all letters to lowercase, conversion of all words to their original form, symbolic and statistical processing of natural language and morphological analysis.

Further, in order to determine a category for an arbitrarily taken web page, the processor 501 can be configured to convert this web page content from HTML to text, tokenize the text, obtain a vector of tokens, and feed the resulting token vector to the input of the classifier ensemble having been trained based on web pages of different categories. For example, the ensemble of classifiers can be trained based on web pages of the following training categories:

web pages designed to enter personal data, credentials or other sensitive data,
web pages containing adult content, gambling content and other high-risk content,
all the other web pages.

Further, the web pages categorized as "all the others" can be removed from further consideration.

The processor 501 can be configured to consider links to each of the web pages categorized as "sensitive data entry pages" as separate respective checkpoints. Information about such checkpoints is stored, for example, in the form of a URL, in the database of the data storage module (160). Moreover, any rubrication of such stored links is possible in the database without limitations, for example, availability of a special tag "page for entering sensitive data".

Further, the processor 501 can be configured to store all links to web pages categorized as "high-risk content pages", for example, as a list of URLs, in the database of the data storage module (160), and consider this list to be another checkpoint.

In additional non-limiting embodiments of the present technology, the processor 501 can also be configured to detect other web pages to be checked for malicious code. In particular, the processor 501 can be configured to detect the web pages which could contain a web-shell.

In order to detect such web pages, which could contain a web shell, the processor 501 can be configured to check, for each of the domains belonging to the network infrastructure 180, availability of special folders where presence of such pages is likely, such as, for example, /wp-content/folder, /just7z/folder, etc., as an example. The names of such folders can be preliminarily stored in a separate list in the database of the data storage module (160).

If there is at least one of such folders, for example, /wp-content/folder, it is checked, by the processor 501, for at least one file where the presence of malicious code is likely, for example, some of the files wso2.5.1.php, wso2.5.php, wso2.php, wso.php, and so on. Names of such files could also be pre-stored in a separate list in the database of the data storage module (160).

In response to the detection of each such file, the processor 501 can be configured to obtain a link, e.g. URL, to that file.

A link to each of the so detected files (web pages) categorized as "pages possibly containing a web shell" is considered, by the processor 501, to be a separate checkpoint. Information about such checkpoints is stored, for example, in the form of a URL, in the database of the data storage module (160). Moreover, any rubrication of such stored links is possible in the database without limitations, for example, availability of a special tag "web shell".

For example, during the above-described check, the processor 501 can be configured to identify /wp-content/folder on one of site3.company.com domains related to the network infrastructure 180, and inside this folder—a web page named wso2.php. In this example, the processor 501 can be configured to store the following link tagged "web shell" in the database of the data storage module (160):

http://site3.company.com/wp-content/wso2.php

Thus, in some non-limiting embodiments of the present technology, the processor 501 can be configured to store all infrastructure elements linked to the given protected infrastructure element obtained at step 210, including the checkpoints found as a result of step (220), i.e., domains, IP addresses, SSL and TLS certificates, open ports, names and versions of running web services of the protected infrastructure (180), and also the checkpoints being the links to web pages, in the database of the data storage module (160).

The method 200 hence advances to step 230.

STEP 230: Analyzing, by the Processor, a Given One of the Linked Infrastructure Elements Associated to the Given Protected Infrastructure Element to Determine a Respective Value Thereof At step (230), according to non-limiting embodiments of the present technology, the processor 501 can be configured to analyze the so identified linked infrastructure elements of the network infrastructure (180) to determine values, or otherwise, statuses thereof. To that end, in some non-limiting embodiments of the present technology, the processor 501 can be configured to scan each one of the linked infrastructure elements by a port scanner, as an example.

According to certain non-limiting embodiments of the present technology, the statuses of the linked infrastructure elements associated with the given protected one can include at least: values of the Domain Name System (DNS) resource records, namely the start-of-authority resource record (SOA) and Name Server (NS) record. However, an embodiment the described method is possible, where the values of other resource record types are also used, i.e., obtained and subsequently monitored, for example, without limitation, resource records of A, CNAME, MX, TXT and SPF types.

In particular, in some non-limiting embodiments of the present technology, the processor 501 can be configured to obtain resource records of TXT type, specifying the DMARC protocol configuration. Such records could be distinguished from the other resource records of TXT type by availability of a combination of characters in the record text.

v=DMARC1

In general, in order to obtain the values of DNS resource records, the processor 501 can be configured to use the information about domains available in the protected infrastructure and detected as a result of step (210). Further, the processor 501 can be configured to determine, for each domain, a list of DNS servers used by this domain, and then obtain, for each DNS server, the values of resource records related to this domain, and store the result in the database of the data storage module (160). For example, to execute these steps, the processor 501 can be configured to use a dig utility or Whois service.

Further, the processor 501 can be configured to determine registration parameters of each of the detected domains of the network infrastructure 180, including, without limitation: domain owner, domain registrar, domain validity period.

In order to obtain the values of these parameters, the processor 501 can be configured to use the information about domains available in the network infrastructure 180 and detected as a result of step (210). To obtain such values, the processor 501 can be configured to use any well-known method, for example, using Whois service, and the result is stored in the database of the data storage module (160).

Further, the values of the linked infrastructure elements can include parameters of certificates installed on each of the domains and IP addresses of the network infrastructure 180. For each of the domains and IP addresses, the processor 501 can be configured to determine at least one of: the status of their SSL certificate or TLS certificate (the status indicates whether the certificate is valid), validity period of the SSL certificate or TLS certificate, and encryption algorithms that could be used by the server on which this certificate is installed.

In order to obtain the values of these parameters, the processor 501 can access the information about domains and IP-addresses available in the network infrastructure 180 and detected as a result of step (210). To obtain the certificate parameters as such could the processor 501 can be configured use, for example, the publicly available OpenSSL library or by generating a GET query to an open online service, such as www.sslshopper.com, and parsing the response text received from this online-service.

Moreover, among other things, the response of the server on which a specific certificate is installed, for example, a TLS certificate, will contain the codes of the supported encryption algorithms. They may look, for example, as follows:

TLS_ECDHE_RSA_WITH_AES_128_GCM_SHA256

Subsequently, when analyzing such codes, the processor 501 can be configured to determine whether the encryption algorithms supported by the domain or server with this installed certificate are weak.

Further, the values of the linked infrastructure elements can include registration parameters for each of the detected IP addresses of the network infrastructure 180 including, for example: address owner, hosting provider, IP address validity period.

In order to obtain the values of these parameters, the processor 501 can be configured to access the information about the IP addresses available in the network infrastructure 180 and detected as a result of step (210). The specified values can be obtained, by the processor 501, for each IP address by any well-known method, for example, using Whois service, and the result is stored in the database of the data storage module (160).

Further, the values of the linked infrastructure elements can include activity parameters of each of the detected IP addresses of the protected infrastructure, such as: a list of ports open on this IP address, and also a list of web services running on this IP address ports and versions of the software corresponding to these web services.

In order to obtain a list of open ports, and also names and versions of the services running on them, the processor 501 can be configured to access the information about the IP addresses available in the protected infrastructure and detected as a result of step (210). Moreover, a so-called port scanner is used by the processor 501, i.e., software implementation of an algorithm built, for example, on the principles of SYN, TCP, UDP, ACK or FIN scanning, or on any other known principles of port scanning, enabling to distinguish an open port from a closed one.

For each IP address, using a previously prepared script or online service (such as, for example, nmap.org), the processor can be configure to obtain a list of ports currently open on a given IP address and also names (identifiers) and versions of the web services running on them. Further, the processor 501 can be configured to store and the result in the database of the data storage module (160). To obtain the list of currently open ports, the processor 501 can be configured to use port scanners. Not only the numbers of open ports but also names and versions of programs (web services) running on them can thus be determined by the processor 501 by to the port scanner.

In other non-limiting embodiments of the present technology, the well-known network utilities supplied with some operating systems, such as netstat and nmap utilities, can be used by the processor 501 to determine the state of ports.

In some non-limiting embodiments of the present technology, the values of the linked infrastructure elements can further include security parameters of the websites of the network infrastructure 180, including, for example: availability of at least one web page with illegal content on the protected infrastructure websites, and also availability of a malicious code on some web pages, such as, for example, pages designed for sensitive data entry.

As links to the web pages categorized as "high-risk content pages" at step (220) have been stored, for example, as a list of URLs, in the database of the data storage module (160), the processor 501 can be configured to use this list as a checkpoint, which status is a list length. More specifically, a zero length of the list indicates absence of pages with high-risk content (gambling, adult content, drugs, etc.) in the network infrastructure 180. In contrast, a nonzero length of the list indicates presence of at least one link to such a page within the network infrastructure 180.

Each link to a page that could contain a malicious code is also considered to be a checkpoint. At the current step (230), the processor 501 can be configured to analyze each of such links to determine presence or absence of a malicious code on these web pages, and based on this determination, the processor 501 can be configured to assign a respective re security status is assigned the analyzed link.

To analyze the pages categorized as "pages, possibly containing a web shell", the processor 501 can be configured to load each of these pages in a browser, and then, using pre-configured signatures, such as YARA rules designed to detect known web shells preliminarily prepared and stored in the database of the data storage module (160), the processor 501 can be configured to analyze the source code of the web page.

More specifically, in one example, when checking the file available through the link http://site3.company.com/wp-content/wso2.php
by one of the YARA rules, for example:

```
}
rule webshell_wso2_5_1_wso2_5_wso2 {
meta:
description = "Web Shell - from files wso2.5.1.php, wso2.5.php, wso2.php"
author = "Florian Roth"
date = "2014/01/28"
score = 70
super_rule = 1
hash0 = "dbeecd555a2ef80615f0894027ad75dc"
hash1 = "7c8e5d31aad28eb1f0a9a53145551e05"
hash2 = "cbc44fb78220958f81b739b493024688"
strings:
$s7 = "$opt_charsets .= '<option value=\"'.$item.'\"'
'. ($_POST['charset']==$item?'selec"
$s8 = "."'</td><td><a href=\"#\"
onclick=\"g(\\'FilesTools\\',null,\\".urlencode ($f['na"
condition:
all of them
``` the processor 501 can be configured to detect a web shell in this file. As a result of this check, the "Malicious Code Detected" status will be assigned to this checkpoint.

Otherwise, if a web shell is not detected, the processor 501 can be configured to assign the "Page Is Safe" status to this page.

Similarly, to analyze the web pages categorized as "pages for entering sensitive data," the processor 501 can be configured to load each of these pages in the browser. Further, the processor 501 can be configured to identify and decode the scripts being the part of the page, and analyze the script code is using the signatures, developed to detect known JS sniffers and exploits, preliminarily prepared and stored in the database of the data storage module (160). Such signatures are well known to those skilled in the art.

For example, as a result of checking a given web page in which script code a JS sniffer or exploit has been detected, the processor 501 can be configured to assign the "Malicious Code Detected" status he checkpoint corresponding to the given web page. If neither JS sniffer nor an exploit is detected, the processor 501 can be configured to assign the status "Page Is Safe" to the checkpoint corresponding to the given web page.

Finally, the processor 501 can be configured to store all the information about the statuses of the so identified checkpoints associated with eth given protected infrastructure element of the network infrastructure (180) checkpoints obtained during execution of step (230) in the database of the data storage module (160). It is worth noting that technically each checkpoint status could be, for example, a character string stored in a text format file. Alternatively, each status could be a database record. In this case, in addition to the status value as such, this record can also store additional information, for example, a kind or type of a checkpoint which this status relates to: DNS data, certificate data, IP address data, etc. In other words, any rubrication of the checkpoint statuses according to their types, varieties, dates and time of receipt, etc. is possible in the database, without limitations.

Hence the method proceeds to step 240.

STEP 240: Determining, by the Processor, Whether the Respective Value of the Given One of the Linked Infrastructure Elements is Indicative of the Network Infrastructure Being Compromised At step (240), according to certain non-limiting embodiments of the present technology, the database of the data storage module (160), the processor 501 can be configured to analyze the respective values of the linked infrastructure elements, that is, statuses of the checkpoints determined at step 230, for indicators of compromise. Furthermore, in response to determine that a respective values of any linked infrastructure element being indicative of indicator of compromise, the processor 501 can be configured to generate at least one warning about potential cyberattack to be transmitted to an operator of the network infrastructure 180.

Figure 4A:
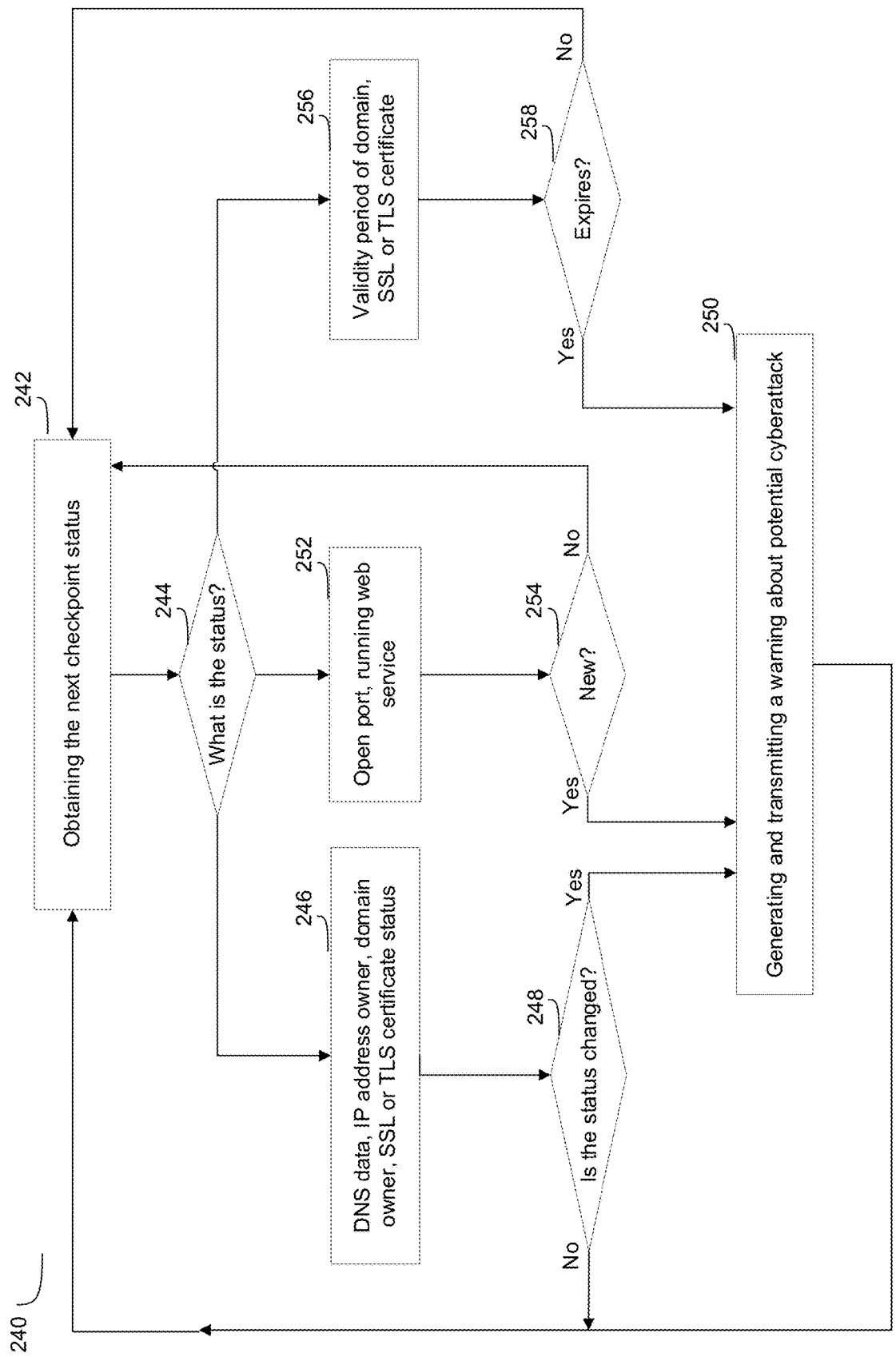
FIG. 4A depicts a flowchart diagram of a step of the method of FIG. 2 for analyzing, by the computing device of FIG. 1, checkpoints of the network infrastructure for indicators of compromise, in accordance with certain non-limiting embodiments of the present technology.
Figure 4B:
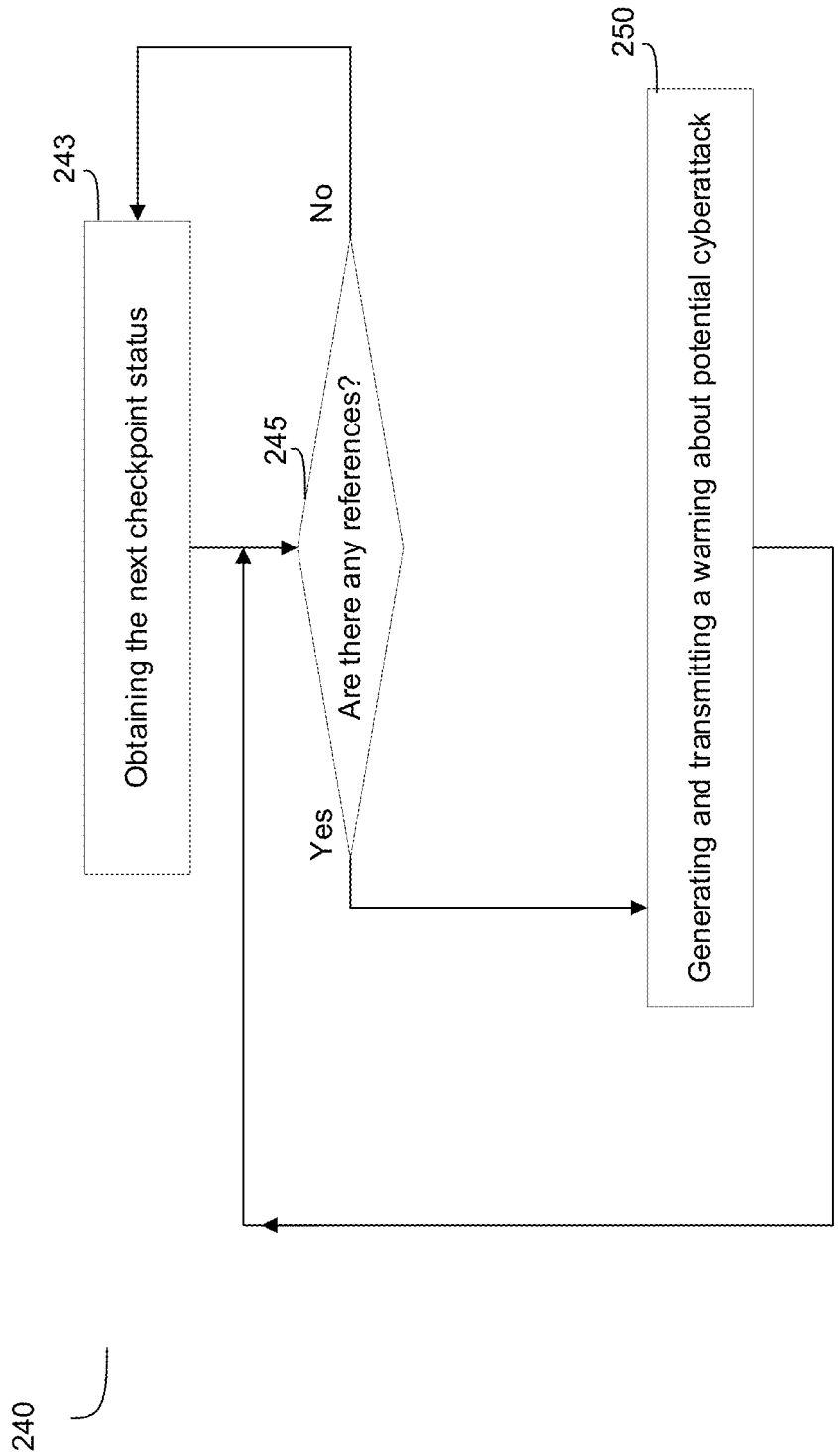
FIG. 4B depicts a flowchart diagram of an other possible algorithm of executing the step of the method of FIG. 2 for analyzing, by the computing device of FIG. 1, checkpoints of the network infrastructure for indicators of compromise, in accordance with certain non-limiting embodiments of the present technology.

With reference to FIGS. 4A and 4B, there are depicted flowchart diagrams of executing, by the processor 501, the step 240 of the method 200, in accordance with certain non-limiting embodiments of the present technology.

It should be noted that the processor 501 can be configured to perform the actions in accordance with the flowchart of FIG. 4A before, after or at the same time as the actions of the flowchart of FIG. 4B, without departing from the scope of the present technology.

It should also be expressly understood that the flowcharts present in FIG. 4A and FIG. 4B are provided solely for the purposes of clarity and understanding of the present technology and thus certain steps thereof are omitted. Thus, during the actual implementation of the present technology, the step 240 can include more steps corresponding to a wider range of checks of the respective values for indicators of compromise.

Thus, according to certain non-limiting embodiments of the present technology, the step (240) could begin at sub-step (242), where the processor 501 can be configured to obtain a given checkpoint status from the list of checkpoint statuses, obtained at step (230), previously stored in the database of the data storage module (160).

Then, at sub-step (244), the processor 501 can be configured to select a check type, which depends on what this checkpoint is, whether it is DNS data, domain, IP address, and so on. Since all checkpoint statuses, as described above in relation to step (230), are classified by checkpoint types when stored in the database, this selection of check type is purely formal and could be performed by any well-known method.

Thus, if the status of the checkpoint (sub-step (246)) is DNS data, IP address owner name, domain owner, SSL or TLS certificate status, then, at sub-step 248, the processor 501 can be configured to determine a change of this status. To that end, for example, the processor 501 can be configured to compare current and previous in time values of this status, where the previous in time value is also obtained from the database of the data storage module (160).

For example, at sub-step (242) at 20.20 on Jan. 18, 2020, the processor 501 has received the checkpoint status, according to which the owner of the IP address 111.222.333.444 was the Company, Ltd. At sub-step (248), the processor 501 can be configured to generate a query to the database, thereby obtaining the previous in time value of the same status. Further, the processor 501 can be configured to identify that, in accordance with the previous status of this checkpoint, obtained at 10.10 on Jan. 17, 2020, the owner of this IP address had also been the Company, Ltd. Thus, the check at step (248) has demonstrated that the status of the checkpoint "owner of the IP address 111.222.333.444" has not been changed. Therefore, it is considered that an indicator of compromise has not been detected, and the method returns to sub-step (242), where a next status is obtained.

In another example, at sub-step (242) at 20.20 on Jan. 18, 2020, the processor 501 can receive the checkpoint status, according to which the owner of the site3.company.com domain is Badguys, Ltd. At sub-step (248), the processor 501 can be configured to generate a query to the database, thereby obtaining the previous in time value of the same status. Thus, the processor 501 can be configured to identify that, in accordance with the previous status of this checkpoint, obtained at 10.10 on Jan. 17, 2020, the owner of this domain had been the Company, Ltd. Thus, the check at sub-step (248) has demonstrated that the status of the checkpoint "domain owner site3.company.com" was changed, and the processor 501 can thus be configured to identify an indicator of compromise. Further, the method proceeds to sub-step (250), where, using the notification module (150) and the communication module (110), the processor 501 can be configured to generate a warning notification about the potential cyberattack, as will be described below. After that, the method also returns to sub-step (242).

Further, if the status of the checkpoint, obtained by the processor 501 at the sub-step 244 is a port open at a given IP address, or a service running on this port (sub-step (252)), the processor 501 proceeds to sub-step (254) to identify whether this port or service is new. In this regard, for example, the processor 501 can be configured to compare current and previous in time values of this status, where the previous in time value is also obtained from the database of the data storage module (160).

For example, at sub-step (242) at 20.20 on Jan. 18, 2020, the processor 501 can receive the checkpoint status, according to which there is an open port 8080 at the IP address 111.222.333.444. At sub-step (254), the processor 501 can be configured to generate a query to the database to obtain the previous in time value of the same status. Further, the processor 501 can be configured to determine that, in accordance with the previous status of this checkpoint, obtained at 20.20 on Jan. 17, 2020, the port 8080 had been also open at this IP address. Thus, the check at sub-step (254) has demonstrated that the status of the checkpoint "port 8080 is open at IP address 111.222.333.444" has not been changed. Therefore, this checkpoint status is not indicative of an indicator of compromise, and the method returns to sub-step (242), where the next status is obtained.

In another example, if at sub-step (252) an open port is detected, at sub-step (254) this port is also checked for belonging to the list of ports, opening of which is considered an indicator of compromise, previously stored in the database of the memory module (160). Further, the processor 501 can generate a query to the database to obtain a list of ports, which opening is considered an unconditional indicator of compromise, and checking whether the detected open port is present in this list. Thus, the port 4899, for example being in this list, is considered an indicator of compromise. Therefore, the method proceeds to step (250), where the processor 501 can be configured to generate a warning about the potential cyberattack. After that, the method also returns to sub-step (242).

In yet other example, at sub-step (242) at 20.20 on Jan. 18, 2020, the processor 501 can receive the checkpoint status, according to which there was an open port 8443 at the IP address 111.222.333.444. Further, at sub-step (254), the processor 501 can be configured to generate a query to the database to obtain the previous in time value of the same status. Further, the processor 501 can be configured to determine that, in accordance with the previous status of this checkpoint, obtained at 20.20 on Jan. 17, 2020, there had been no open port 8443 at this IP the address. Thus, the check at step (254) has demonstrated that the status of the checkpoint "port 8443 is open at IP address 111.222.333.444" has been changed, and the processor 501 can thus be configured to determine an indicator of compromise. Therefore, the method proceeds to step (250), where the processor 501 can be configured to generate the warning about the potential cyberattack. After that, the method also returns to sub-step (242).

It should be noted that an intruder, having accessed a legal infrastructure, could, in particular, install a malicious code management system in it, or a proxy server that enables forwarding (proxying) queries from the malicious code to some other server belonging to the intruder. Due to such proxying, the intruder hides the address of the real malicious server, and the malicious program interacts with legal and trusted infrastructure, that greatly complicates its detection. The general name for this kind of web services is the command and control server or C2 server.

It should also be noted that most of the existing C2 servers are well known to those skilled in the art, in particular, ports that prefer to use these programs, traffic encryption algorithms used by them, and also various features of their functioning, up to typical errors identified for specific versions of one or another C2 server.

In some non-limiting embodiments of the present technology, if the checkpoint status, received by the processor 501 at the sub-step 242, is an open port, and the name of the web service running on it is unknown, then this web service could be checked (not shown in FIG. 4A) by the processor 501 whether this web service is a command and control server of the intruders.

For example, the processor 501 can be configured to conduct such a check with respect to all ports shown in FIG. 3C for which the name of the running web service could not be determined, i.e., ports 111.222.333.444:22 (362), 111.222.333.444:443 (364) and 111.222.333.444:50050 (366).

In alternative non-limiting embodiments of the present technology, the processor 501 can be configured to perform such a check with respect to only those open ports that are in the list of the ports used by known C2 servers. This list could also contain the names of the corresponding C2 servers and a list of the features of each of the C2 servers. Such a list could be prepared in advance and stored in the database of the memory module (160).

As applied to the above example, the processor 501 can be configured to determine availability of ports 22, 443 and 50050 in the list of the ports used by known C2 servers. As a result, the processor 501 can determine that only one of these ports is in the list, namely 50050, and, from the list the information, the processor 501 can further determine that the port 50050 is often used by the Cobalt Strike Team Server (a penetration testing software product also popular with intruders). In this case, the actions below are applied to this port only.

Further, the processor 501 can be configured to determine whether the web service running on the port 50050 is not a command and control server of the intruders. To that end, the processor 501 can be configured to send a typical HTTP request to this port, and further analyze a respective response received from the web service running on the port 50050.

Since from the list of ports used by well-known C2 servers, the processor 501 has previously received the information that the port 50050 is used by the Cobalt Strike Team Server, in order to check the response received from the web service running on this port, the processor 501 can be configured to select a characteristic feature from the database inherent in the Cobalt Strike Team Server: such as an extra space in this server response.

Further, in response to determining an extra space in the server response, the processor 501 can be configured to determine an indicator of compromise, and the method 200 proceeds to the step 250 described below. After that, the method 200 returns to the sub-step 242 where the processor 501 obtains the next checkpoint status.

In contrast, in response to not identifying an extra space in the server response, the processor 501 can be configured to determine a legitimate web service is running on the port 50050, and the method 200 returns to the sub-step 242.

In some non-limiting embodiments of the present technology, if the checkpoint status is the value of the DNS resource record, then, the processor 501 can be configured to determine whether the DNS server is functioning correctly (not shown in FIG. 4A). For example, the processor 501 can be configured to search for keywords or numerical values, corresponding to the correct functioning of the DNS server, in the text of the resource record. If such keywords are not identified or the numerical values do not correspond to the correct functioning of the DNS server, the processor 501 can be configured to detect an indicator of compromise, and the method 200 proceeds to the step 250. After that, the method returns to the sub-step 242 where the next checkpoint status is obtained.

By way of non-limiting example, the said check of DNS resource record values could be performed by the processor 501 being configured to determine at least one of the following states, each of which is considered a separate indicator of compromise:

- receiving no DNS responds to respective queries,
- at least one of DNS responding within a time longer than a predetermined time,
- at least one of DNS not declaring itself authoritative,
- Domain Name System Security Extensions (DNSSEC) being not supported for a domain associated with the given protected infrastructure element,
- DNS list provided by a root server not corresponding to a list published by the DNS,
- only one DNS being associated with the domain of the given protected infrastructure element,
- at least one DNS being capable of responding to any DNS lookup from any IP,
- at least one DNS being an Open Zone Transfer Server providing information in a DNS zone,
- at least one DNS server having a private IP address,
- no published DNS record being identified for the domain or a host name associated with the given protected infrastructure element,
- more than one DNS being present on a same C class subnet,
- a DNS SOA validity period being different from that recommended by a Request for Comments (RFC),
- a DNS SOA cache value being different from that recommended by the RFC,
- a DNS SOA update value being different from that recommended by the RFC,
- a DNS SOA retry value being different from that recommended by the RFC,
- SOA serial numbers mismatching, and
- an invalid format of DNS SOA serial number.

In some non-limiting embodiments of the present technology, if the checkpoint status is the value of a DNS (Domain Name System) resource record comprising the DMARC protocol settings, the processor 501 can be configured to determine whether the DMARC protocol is installed and configured correctly (not shown in FIG. 4A). For example, the processor 501 can check if DMARC tags in the resource record text correspond to the correct protocol setting. Absence of such tags, as well as absence of the resource record itself comprising the DMARC settings, is considered an indicator of compromise.

For example, the processor 501 can receive a checkpoint status, according to which the DNS resource record comprises the following DMARC protocol settings:

"v=DMARC1; p=none;"

Further, the processor 501 can be configured to determine whether the text of this resource record does not contain any of the tags, which presence indicates the correct setting of the protocol, namely, quarantine and reject tags. Further, in response to determining that the text does not include such tags, the processor 501 can be configured to detect an indicator of compromise, and the method 200 proceeds to the step 250. Thereafter, the method 200 returns to the sub-step 242 where the next checkpoint status is obtained.

In yet other example, the processor 501 can receive the status of a checkpoint, according to which the DNS resource record comprises the following DMARC protocol settings:

"v=DMARC1; p=quarantine; rua=mailto: admin@company.com"

Further, the processor 501 can be configured to determine whether the text of this resource record contains one of the tags, which presence indicates the correct setting of the protocol, namely, quarantine tag. Further, in response to determining that the text includes such tags, the processor 501 can be configured not to determine an indicator of compromise has not been detected, and the method 200 proceeds to the sub-step 242 where the next checkpoint status is obtained.

Additionally, if the checkpoint status is a service running on a certain port, the processor 501 can be configured to determine whether this service is legitimate (not shown in FIG. 4A). This check could be performed, for example, by searching, using the analytic module (140), for the service name in a preliminarily compiled list of legitimate web services stored in the database of the data storage module (160).

For example, the processor 501 can receive a checkpoint status, according to which the Apache Tomcat web service is running on the port 8080. Further, the processor 501 can be configured to generate a query to the database, and further determine that the Apache Tomcat name is present in the list of legitimate services. Therefore, an indicator of compromise has not been detected, and the method 200 returns to the sub-step 242 where the next checkpoint status is obtained.

In another example, the processor 501 can receive a checkpoint status, according to which the TeamViewer web service is running on the port 5938. Further, the processor 501 can be configured to generate a query to the database to further determine that the TeamViewer name is not present in the list of legitimate services. This is considered an indicator of compromise. Therefore, the method 200 proceeds to the step 250. Further, the method 200 returns to the sub-step 242 where the next checkpoint status is obtained.

Additionally, if the checkpoint status is a service running on a certain port, the processor 501 can be configured to determine whether this web service version belongs to the known vulnerable versions of this web service (not shown in FIG. 4A). To that end, the processor 501 can be configured to identify the obtained service version in a preliminarily compiled list of legitimate web service vulnerable versions stored in the database of the data storage module (160).

For example, the processor 501 can be configured to receive a checkpoint status, according to which the Apache Tomcat v.3.3.2 service is running on the port 8080. Further, the processor 501 can be configured to generate a query to the database to identify therein that the Apache Tomcat v.3.3.2 version is not in the list of this service vulnerable versions. Therefore, an indicator of compromise has not been detected, and the method 200 returns to the sub-step 242 where the next checkpoint status is obtained.

In the other example, the processor 501 can receive a checkpoint status, according to which the Cisco TFTP Server v.1.1 service is running on the port 69. Further, the processor 501 can be configured to generate a query to the database to identify therein that the Cisco TFTP Server v.1.1 version is present in the list of this service vulnerable versions. Thus, the processor 501 can be configured to determine an indicator of compromise. Therefore, the method 200 proceeds to the step 250. After that, the method 200 also returns to the sub-step 242 where the next checkpoint status is obtained.

Additionally, of the processor 501 has determined that the web service running on a certain port is a legitimate service and is one of the database management systems (DBMS), such as, for example, MongoDB, or cloud storage, such as, for example, S3 Buckets, then the processor 501 can be configured to check this service (not shown in FIG. 4A) whether this DBMS or this storage is available to unauthorized users.

For example, in some non-limiting embodiments of the present technology, the processor 501 can be configured to select a string of the test query, which syntax corresponds to the kind of the running web service, from the list of test requests stored in the database of the data storage module (160), and further send this query through to the address of the running web service. In response to receiving a response like "authorization error", the processor 501 can be configured to determine that DBMS or storage is not available to unauthorized users.

In response to receiving, any response other than a response like "Authorization Error", the processor 50' can be configured to detect an indicator of compromise. Therefore, in this case, the method 200 proceeds to the step 250. Thereafter, the method 200 can return to the sub-step 242 where the next checkpoint status is obtained.

For example, the processor 501 can receive a checkpoint status, according to which the legitimate MongoDB service is running on the port 27017. Further, the processor 501 can be configured to select a test query, that corresponds to the MongoDB syntax, for example, >db.users.find( );

Further, the processor 501 can be configured to send this query to the address of the running web service. In response to receiving a response like "Authorization Error", the processor 501 can be configured to determine that this DBMS is not available to unauthorized users, and thus an indicator of compromise is not detected, and the method 200 returns to the sub-step 242 where the next checkpoint status is obtained.

In another example, the processor 501 can be configured to receive a checkpoint status, according to which the legitimate mySQL service is running on the port 3306. Further, the processor 501 can be configured to select a test query that corresponds to the mySQL syntax, for example, mysqli_connect('111.222.333.444:3306','root', 'root', 'DataBase1');

In response to receiving a response like "Error" 2002—No such file or directory", that is different form an "Authorization Error" response, the processor 501 can be configured to determine an indicator of compromise. The method 200 proceeds to the step 250 where. After that, the method 200 also returns to the sub-step 242 where the next checkpoint status is obtained.

Finally, if the checkpoint (256) status represents the SSL or TLS certificate validity period, then at sub-step (258), the processor 501 can be configured to determine whether this validity period expires soon, for example, it expires within 30 days, starting from the current moment, or, for example, within 15 days. To that end, for example, the processor 501 can be configured to calculate the difference between the certificate validity period obtained from the status (256) and the current date obtained from the system clock of the computing device 100 implementing the method (200).

For example, at sub-step (242), the processor 501 can receive t the checkpoint (256) status, according to which the SSL certificate, which expires on Dec. 20, 2021, is installed on the company.com domain. At sub-step (258), the processor 501 can be configured to access the system clock to obtain the current date, which is, for example, Jan. 17, 2020. The current date is then subtracted from the certificate expiration date to obtain 703 (days). By comparing the resulting difference with a preset threshold value, for example, 30, the processor 501 can thus determine that the SSL certificate of the company.com domain will be valid longer than a predetermined validity time interval. Therefore, an indicator of compromise is not detected, and the method 200 returns to sub-step (242), where the next status is obtained.

In another example, at sub-step (242), the processor 501 can receive the checkpoint (256) status, according to which the SSL certificate, which expires on Feb. 14, 2020, is installed on the company.com domain. At sub-step (258), using the analytical module (140), the processor 501 accesses the system clock to obtain the current date which is, for example, Jan. 17, 2020. The current date is then subtracted from certificate expiration date to obtain 28 (days). By comparing the resulting difference with a predetermined validity time interval, for example, 30, the processor 501 can determine that the SSL certificate of the company.com domain will soon expire. Therefore, the processor 501 can determine an indicator of compromise, and the method 200 proceeds to step (250). After that, the method 200 returns to sub-step (242).

Additionally, if the checkpoint status represents encryption algorithms used by one of the protected infrastructure objects, where SSL or TLS certificate is installed, then the processor 501 can be configured to whether there are weak encryption algorithms among the encryption algorithms being used (not shown in FIG. 4A). To that end, the processor 501 can be configured to identify the codes corresponding to the encryption algorithms supported by this computing device 100 in the lists of codes corresponding to weak encryption algorithms. In this case, the list of codes corresponding to weak encryption algorithms can be stored in the database of the data storage module (160).

For example, the processor 501 can receive a checkpoint status, according to which one of the protected infrastructure objects, for example, the site2.company.com domain, with the TLS v.1.2 certificate installed on it, uses the encryption algorithms represented by the following set of codes:

TLS_ECDHE_RSA_WITH_AES_256_GCM_SHA384

Further, the processor 501 can generate a query to the database to identify that the given set of codes corresponds to the safe or recommended set of encryption algorithms. Therefore, an indicator of compromise is not detected, and the method 200 returns to the sub-step 242 where the next checkpoint status is obtained.

In another example, the processor 501 can receive a checkpoint status, according to which one of the elements of the network infrastructure 180, for example, the company.com domain, with the TLS v.1.2 certificate installed on it, uses the encryption algorithms represented by the following set of codes:

TLS_ECDHE_RSA_WITH_3DES_EDE_CBC_SHA

Further, the processor 501 can be configured to generate a query to the database to determine that this set of codes corresponds to weak encryption algorithms. Thus, the processor 501 can be configured to determine an indicator of compromise. Therefore, the method 200 proceeds to the step 250. After that, the method 200 returns to the sub-step 242 where the next checkpoint status is obtained.

In some non-limiting embodiments of the present technology, if the checkpoint status represents the security status of a web page to be checked for malicious code, then the processor 501 can be configured to determine whether this status is "Page Is Safe" (not shown in FIG. 4A). In response to determining discrepancy between the current status of this checkpoint and the "Page Is Safe" value, for example, if the current status is "Malicious Code Detected", the processor 501 can be configured to determine an indicator of compromise.

Therefore, in this case, the method 200 proceeds to the step 250, where a warning about potential cyberattack is generated and transmitted by the notification module (150) and the communication module (110). After that, the method 200 returns to the sub-step 242 where the next checkpoint status is obtained.

Also, in some non-limiting embodiments of the present technology, if the checkpoint status represents the length of the list of links to web pages comprising high-risk content, the processor 501 can be configured to determine whether the list length is zero (not shown in FIG. 4A).

In response to determining that the length of this list is zero, the processor 501 can determine that the network infrastructure 180 does not contain any web page with high-risk content (i.e., content devoted to such topics as gambling, erotica and pornography, drugs, etc.). In this case, the method 200 returns to the sub-step 242 where the next checkpoint status is obtained.

By contrast, if the length of the list of links to web pages comprising high-risk content differs from zero, the processor 501 can be configured to determine that an indication that at least one page with such content is within the network infrastructure 180, which is considered an indicator of compromise.

Therefore, in this case, the method 200 proceeds to the step 250. After that, the method 200 returns to the sub-step 242 where the next checkpoint status is obtained.

As described above in relation to step (210) and FIG. 2, the indicators of compromise processed by the described method could also include information about sensitive data leaks, for example, names of companies, the illegal access to which infrastructure has been put up for sale on specialized forums used by cybercriminals, information about such companies' employees credentials put up for sale, and also information that one of the computing devices belonging, judging by its IP address, to the network infrastructure 180, accessed at least one command server owned by the intruders.

In the context of the present specification "confidential data" denotes at least one of the following: credentials of the protected infrastructure users, personal data of the protected infrastructure users, contact details of the protected infrastructure users, including business email addresses, payment details of the protected infrastructure users, and also other confidential information stored in the devices of the network infrastructure 180, for example, databases, file storages, network shared folders, etc.

In accordance with certain non-limiting embodiments of the present technology, the processor 501 can be configured to receive such indicators of compromise from closed sources, such as specialized forums for cybercriminals. In other embodiments, the processor 501 can be configured to obtain these indicators in advance as a result of operation of the third-party systems analyzing a code and/or detonating malicious files. Similarly, such indicators of compromise could be collected from the specified sources continuously by the third-party systems or operators, converted into any suitable format, and periodically entered to the computing device 100 implementing the method 200. For example, such indicators of compromise could enter once a day, every four hours, every hour, and so on.

Data having the meaning of the next received portion of the above indicators of compromise could be considered by the computing device 100 implementing the method (200) as the next status of the cyberattack surface checkpoint of the network infrastructure 180.

With reference to FIG. 4B, there is depicted a flowchart diagram of the step 240 of the method 200, in accordance with certain non-limiting embodiments of the present technology. Thus, upon receiving, at sub-step (243), the next such checkpoint status, at sub-step (245), the processor 501 can be configured to search keywords corresponding to the confidential data of the network infrastructure 180 in the received data. The list of such keywords could be compiled in advance, before executing the method 200, as an example.

In some non-limiting embodiments of the present technology, for example, this list could include at least one of: the names of at least one company that owns the protected infrastructure, domain names of the domains they own, the IP addresses of the protected infrastructure devices, and other keywords enabling to find the desired sensitive information in the received next checkpoint status or indications that it is used or offered for sale by intruders, or that at least one of the devices of the network infrastructure 180 sent a request to at least one known command server of the intruders.

For example, at sub-step (243) the processor 501 can receive the above checkpoint status, and at sub-step (245), the processor 501 can be configured to identify a keyword in the obtained data. In response to receiving a zero result, that is, not identifying any keywords in the obtained data, the processor 501 can be configured to determine absence of any offers for sale of the compromised sensitive data related to the network infrastructure 180 on the resources used by the intruders, as well as absence in the results of known malicious program code and/or traffic analysis, executed by third-party systems, any indications that some device belonging, judging by its domain name or IP address, to the network infrastructure 180, sent requests to some known external command and control server owned by the intruders. Therefore, an indicator of compromise has not been detected, and the method 200 returns to sub-step (243), where the next checkpoint status is obtained, that is, a new amount of data from Internet resources used by intruders.

By contrast, after conducting the keyword search as mentioned above, the processor 501 can receive a nonzero result; for example, at searching for a keyword representing the corporate email domain @ company.com, the processor 501 can identify valid corporate email addresses of the company employees: ivan@company.com, petr@company.com, and emelya@company.com. In response, the processor 501 can be configured to determine that corporate addresses being found among the data offered for sale by intruders, which can further be determined as being an indicator of compromise. In another example, when searching for a keyword representing the IP address of one of the devices of network infrastructure 180, the processor 501 can determine that this address has been used to access one of the known IP addresses belonging to the command and control servers of the intruders. Therefore, in both described cases, the method 200 proceeds to step (250). After that, the method 200 returns to sub-step (245), where the keyword search is going on.

The method 200 thus advances to step 250.

Step 250: In Response to the Respective Value of Any One of the Linked Infrastructure Elements Associated to the Given Protected Infrastructure Element Being Indicative of the Network Infrastructure Being Compromised: Generating, by the Processor, at Least One Warning About a Potential Cyberattack, and Transmitting, by the Processor, the at Least One Warning Cyberattack to an Operator of the Network Infrastructure Thus, having determined any indicator of compromise as described above, at step 250, the processor 501 can be configured to generate a warning notification about the potential cyberattack and transmit such a notification to the operator of the network infrastructure 180.

More specifically, as described above with reference to FIG. 1, the processor 501 can be configured to generate the warning notification in at least one of the following formats: an e-mail, an SMS, an MMS, by a push notification, a message in an instant messenger by creating an API event.

It should be noted that use of such a notification tool as API events enables to implement additional integration of the described system with various third-party tools, such as firewalls, security management platforms, SIEM solutions, and so on.

The method 200 hence terminates.

Computing Environment

Figure 5:
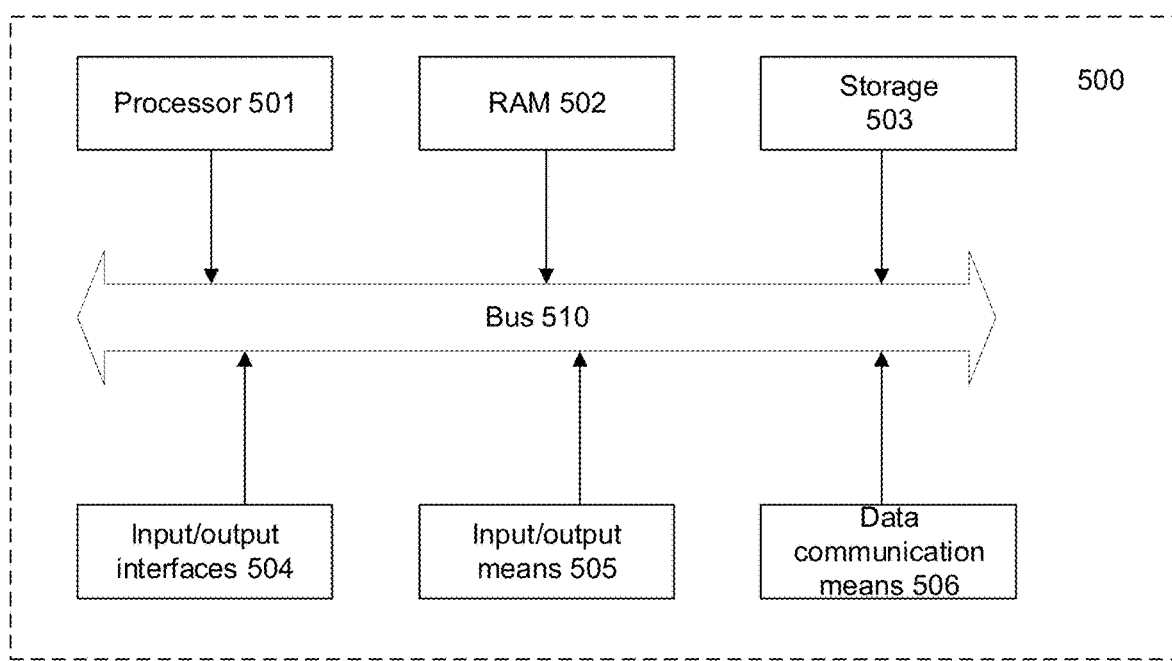
FIG. 5 depicts a schematic diagram of an example computing environment configurable for execution of the present methods of FIG. 2, in accordance with certain non-limiting embodiments of the present technology.

With reference to FIG. 5, there is depicted an example functional diagram of the computing device 500 configurable to implement certain non-limiting embodiments of the present technology including the method 200 described above.

In some non-limiting embodiments of the present technology, the computing device 500 may include: the processor 501 comprising one or more central processing units (CPUs), at least one non-transitory computer-readable memory 502 (RAM), a storage 503, input/output interfaces 504, input/output means 505, data communication means 506.

According to some non-limiting embodiments of the present technology, the processor 501 may be configured to execute specific program instructions the computations as required for the computing device 500 to function properly or to ensure the functioning of one or more of its components. The processor 501 may further be configured to execute specific machine-readable instructions stored in the at least one non-transitory computer-readable memory 502, for example, those causing the computing device 500 to execute the method 200.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scrips or XML. Various algorithms are implemented with any combination of the data structures, objects, processes, procedures and other software elements.

The at least one non-transitory computer-readable memory 502 may be implemented as RAM and contains the necessary program logic to provide the requisite functionality.

The storage 503 may be implemented as at least one of an HDD drive, an SSD drive, a RAID array, a network storage, a flash memory, an optical drive (such as CD, DVD, MD, Blu-ray), etc. The storage 503 may be configured for long-term storage of various data, e.g., the aforementioned documents with user data sets, databases with the time intervals measured for each user, user IDs, etc.

The input/output interfaces 504 may comprise various interfaces, such as at least one of USB, RS232, RJ45, LPT, COM, HDMI, PS/2, Lightning, FireWire, etc.

The input/output means 505 may include at least one of a keyboard, joystick, (touchscreen) display, projector, touchpad, mouse, trackball, stylus, speakers, microphone, and the like. A communication link between each one of the input/output means 505 can be wired (for example, connecting the keyboard via a PS/2 or USB port on the chassis of the desktop PC) or wireless (for example, via a wireless link, e.g., radio link, to the base station which is directly connected to the PC, e.g., to a USB port).

The data communication means 506 may be selected based on a particular implementation of the network 120, and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 404 may be configured for wired and wireless data transmission, via one of WAN, PAN, LAN, Intranet, Internet, WLAN, WMAN, or GSM networks.

These and other components of the computing device 500 may be linked together using a common data bus 510.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for detecting a cyberattack in a network infrastructure, the method being executable by a computing device including a processor communicatively couplable to the network infrastructure, the network infrastructure having an infrastructure external perimeter, the computing device being disposed externally with respect to the infrastructure external perimeter, the method comprising:
   obtaining, by the processor, data representative of a given protected infrastructure element;
   accessing, by the processor, a network graph representative of a network including the network infrastructure to identify in the network graph, based on the given protected infrastructure element, an infrastructure graph representative of the network infrastructure,
      a given vertex of the infrastructure graph being representative of a respective one of linked infrastructure elements associated to the given protected infrastructure element in the network infrastructure; and
      a given edge connecting two adjacent vertices being representative of a respective common parameter between respective infrastructure elements associated with the adjacent nodes;
   analyzing, by the processor, a given one of the linked infrastructure elements associated to the given protected infrastructure element to determine a respective value thereof;
   determining, by the processor, whether the respective value of the given one of the linked infrastructure elements is indicative of the network infrastructure being compromised;
   in response to the respective value of any one of the linked infrastructure elements associated to the given protected infrastructure element being indicative of the network infrastructure being compromised:
      generating, by the processor, at least one warning about a potential cyberattack, and
      transmitting, by the processor, the at least one warning cyberattack to an operator of the network infrastructure.

2. The method of claim 1, wherein the given protected infrastructure element comprises at least one of:
   a domain,
   an IP address,
   an SSL certificate,
   an e-mail address,
   an FTP server address,
   a database management system address,
   a file hosting web service address, and
   a name of a web service and a respective port in which the web is running.

3. The method of claim 2, wherein the respective one of the linked infrastructure elements associated with the given protected infrastructure element comprises at least one of:
   an other domain,
   an other IP address,
   an other SSL certificate,
   an other TLS certificate,
   a name and a respective version numbers of an other web service, and
   a link to at least one web page associated with the given protected infrastructure element.

4. The method of claim 1, wherein identifying the network infrastructure graph comprises scanning the given protected infrastructure element with a port scanner.

5. The method of claim 1, wherein the respective value of the given one of the linked infrastructure elements comprises at least one of:
   Domain Name System (DNS) resource record values,
   a value of a domain name system record comprising DMARC protocol settings,
   an IP address owner company name,
   an IP address hosting provider,
   an IP address validity period,
   a list of ports opened on an IP address associated with the given protected infrastructure element,
   a list of network services running on the IP address,
   a name of a domain owner,
   a domain registrar,
   a domain validity period,
   statuses of one of the SSL and TLS certificate,
   parameters of one of the SSL and TLS certificate including data of encryption algorithms;
   a validity period of one of the SSL and TLS certificate,
   a security status of a web page associated with the given protected infrastructure element, and
   length of a list of links to web pages including high-risk content.

6. The method of claim 1, wherein indicators of the network infrastructure being compromised include at least one of:
   a change of DNS data,
   DNS malfunctioning,
   a change of an IP-address owner,
   a change of a domain name owner,
   a change of a SSL certificate status,
   a change of a TLS certificate status,
   at least one of SSL encryption algorithms being determined as being a weak SSL encryption algorithm,
   at least one TLS encryption algorithm being determined as being a weak TLS encryption algorithm,
   missing or incorrect configuration of DMARC protocol,
   opening a new port,
   launching a new service,
   absence of a launched service in a list of known legitimate services, a version of a launched legitimate service being determined as being known vulnerable version,
receiving, in response to a test request, from a legitimate web service, any other response, except for "Authorization Error" response,
an expired domain name,
an expired SSL certificate,
an expired TLS certificate,
detection of at least one web page associated with the given protected infrastructure element with illegal content,
detection of a malicious code on at least one web page associated with the given protected infrastructure element,
detection of at least one access of at least one of devices associated with the given protected infrastructure element to at least one command server of intruders,
detection of at least one command server of intruders within the protected infrastructure.

7. The method of claim 6, wherein the DNS malfunctioning comprises at least one of:
receiving no DNS responds to respective queries,
at least one of DNS responding within a time longer than a predetermined time,
at least one of DNS not declaring itself authoritative,
Domain Name System Security Extensions (DNSSEC) being not supported for a domain associated with the given protected infrastructure element,
a DNS list provided by a root server not corresponding to a list published by the DNS,
only one DNS being associated with the domain of the given protected infrastructure element,
at least one DNS being capable of responding to any DNS lookup from any IP,
at least one DNS being an Open Zone Transfer Server providing information in a DNS zone,
at least one DNS server having a private IP address,
no published DNS record being identified for the domain or a host name associated with the given protected infrastructure element,
more than one DNS being present on a same C class subnet,
a DNS SOA validity period being different from that recommended by a Request for Comments (RFC),
a DNS SOA cache value being different from that recommended by the RFC,
a DNS SOA update value being different from that recommended by the RFC,
a DNS SOA retry value being different from that recommended by the RFC,
SOA serial numbers mismatching, and
an invalid format of a DNS SOA serial number.

8. The method of claim 6, wherein the indicators of the network infrastructure being compromised further include information about sensitive data leaks in the network infrastructure.

9. The method of claim 8, further comprising determining if the information about the sensitive data leaks includes protected infrastructure sensitive data, and in response to detection of at least one leak of the protected infrastructure sensitive data, the method further comprises generating the at least one warning about the potential cyberattack.

10. The method of claim 9, wherein the protected infrastructure sensitive data comprise at least one of:
credentials of users of the network infrastructure,
personal data of the users of the network infrastructure,
contact details of the users of the network infrastructure,
payment details of the users of the network infrastructure, and
confidential information stored on the protected infrastructure devices.

11. The method of claim 1, wherein the at least one generated cyberattack warning is transmitted to an electronic device of the operator of the network infrastructure via at least one of:
an e-mail,
an SMS,
an MMS,
a push notification,
an instant messenger message, and
an API event.

12. A computing device for detecting a cyberattack in a network infrastructure, the network infrastructure having an infrastructure external perimeter, the computing device being disposed externally with respect to the infrastructure external perimeter, the computing device including:
a processor communicatively couplable to the network infrastructure; and
non-transitory computer-readable medium storing instructions,
the processor, upon executing the instructions, being configured to:
obtain data representative of a given protected infrastructure element;
access a network graph representative of a network including the network infrastructure to identify in the network graph, based on the given protected infrastructure element, an infrastructure graph representative of the network infrastructure,
a given vertex of the infrastructure graph being representative of a respective one of linked infrastructure elements associated to the given protected infrastructure element in the network infrastructure; and
a given edge connecting two adjacent vertices being representative of a respective common parameter between respective infrastructure elements associated with the adjacent nodes;
analyze a given one of the linked infrastructure elements associated to the given protected infrastructure element to determine a respective value thereof;
determine whether the respective value of the given one of the linked infrastructure elements is indicative of the network infrastructure being compromised;
in response to the respective value of any one of the linked infrastructure elements associated to the given protected infrastructure element being indicative of the network infrastructure being compromised:
generate at least one warning about a potential cyberattack, and
transmit the at least one warning cyberattack to an operator of the network infrastructure.

* * * * *